United States Patent
Nagao

[19]
[11] Patent Number: 6,055,340
[45] Date of Patent: Apr. 25, 2000

[54] METHOD AND APPARATUS FOR PROCESSING DIGITAL IMAGES TO SUPPRESS THEIR NOISE AND ENHANCING THEIR SHARPNESS

[75] Inventor: Kimitoshi Nagao, Kanagawa, Japan

[73] Assignee: Fuji Photo Film Co., Ltd., Kanagawa, Japan

[21] Appl. No.: 09/032,112

[22] Filed: Feb. 27, 1998

[30] Foreign Application Priority Data

| Feb. 28, 1997 | [JP] | Japan | 9-062101 |
| Feb. 28, 1997 | [JP] | Japan | 9-062102 |

[51] Int. Cl.$^7$ .................................................. G06K 9/40
[52] U.S. Cl. .......................... 382/261; 382/263; 382/264; 382/266; 382/275
[58] Field of Search .................................... 382/260, 261, 382/263, 264, 266, 269

[56] References Cited

U.S. PATENT DOCUMENTS

| 3,814,847 | 6/1974 | Longuet . | |
| 4,399,461 | 8/1983 | Powell . | |
| 4,442,454 | 4/1984 | Powell . | |
| 4,446,484 | 5/1984 | Powell . | |
| 4,463,381 | 7/1984 | Powell et al. . | |
| 4,553,165 | 11/1985 | Bayer . | |
| 4,561,022 | 12/1985 | Bayer . | |
| 5,010,504 | 4/1991 | Lee et al. ................................. | 382/263 |
| 5,271,064 | 12/1993 | Dhawan et al. ......................... | 382/264 |
| 5,485,534 | 1/1996 | Takemoto et al. ...................... | 382/263 |
| 5,550,936 | 8/1996 | Someya et al. ......................... | 382/263 |
| 5,933,540 | 8/1999 | Lakshminarayanan .................. | 382/260 |

FOREIGN PATENT DOCUMENTS

| 57-500311 | 2/1982 | Japan ............................. | G06K 9/56 |
| 57-500354 | 2/1982 | Japan ............................. | G06F 15/20 |

OTHER PUBLICATIONS

"A Method for the Digital Enhancement of Unsharp, Grainy Photographic Images", Powell et al., Proceedings of the International Conference on Electronic Image Processing Jul. 26–28, 1982, pp. 179–183.

"Relating Granularity to Graininess", Takafumi Noguchi, Journal of the Society of Photographic Science and Technology of Japan, 57(6), 415(1994).

Primary Examiner—Scott Rogers
Assistant Examiner—Lartherrio E. Thornton
Attorney, Agent, or Firm—Sughrue, Mion, Zinn, Macpeak & Seas, PLLC

[57] ABSTRACT

A method of processing digital images to suppress their noise and enhance their sharpness. The method of suppressing noise and enhancing their sharpness includes steps of: (a) performing a sharpness enhancing process on original image data to generate sharpness enhance image data also performing a smoothing process on original image data to generate smoothed image data; (b) subtracting the smoothed image data from sharpness enhanced image data to extract a component consisting of both edges and noise; (c) performing nonlinear transformation on edge/noise containing component to separate a noise component and performing a subdividing process on the resulting noise component to produce a subdivided noise component; (d) separately detecting an edge component from original image data and determining weighting data for an edge region and a noise region from the detected edge component; (e) weighting edge/noise containing component with the weighting data for edge region to produce an edge enhancing component; and (f) subtracting subdivided noise component multiplied by a factor from sharpness enhanced image data while adding edge enhance component multiplied by another factor to sharpness enhanced image data so as to generate processed image data. The effect of the method is to process digital images to suppress their noise and enhance their sharpness.

18 Claims, 16 Drawing Sheets

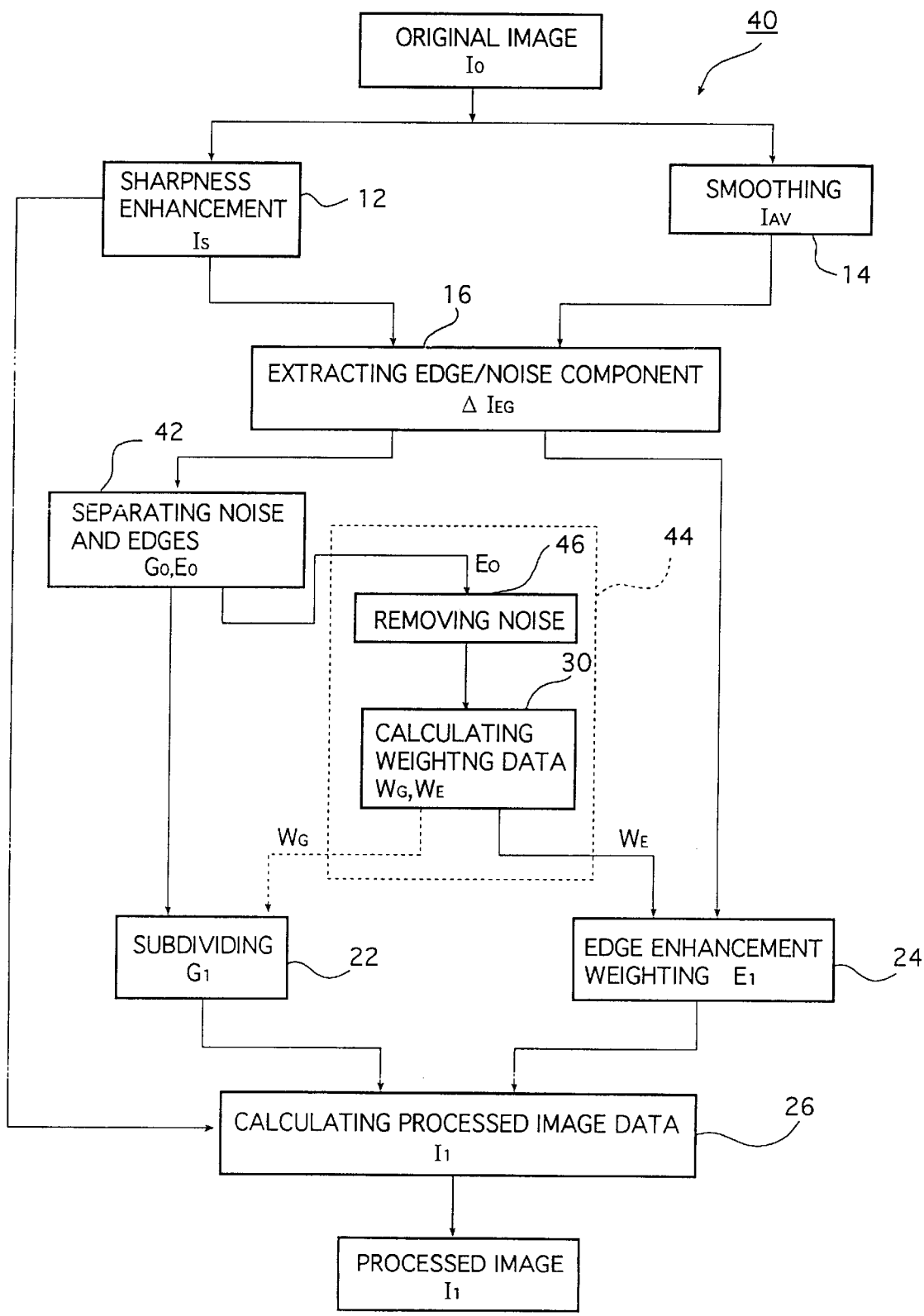

METHOD AND APPARATUS FOR PROCESSING DIGITAL IMAGES TO SUPPRESS THEIR NOISE AND ENHANCING THEIR SHARPNESS

BACKGROUND ART

This invention relates to a method and an apparatus of image processing for noise suppression and sharpness enhancement of digital images, or specifically to a method and an apparatus by which noise such as graininess in digital images can be suppressed while enhancing their sharpness.

In the present invention, the noise in digital image is called "grain or graininess" in view of the appropriateness of the expression if the image reproduced in photographs, printed documents and so forth is discussed and the noise region of a digital image being processed which consists of a noise component and which is to be separated from the edge region which consists of an edge (contour) component is called "a grainy or flat region" in view of the appropriateness of the expression if the image reproduced in photographs, printed documents and so forth is discussed.

In digital imaging technology which records pictures such as photographs with an image input scanner and which outputs digital images with an image output printer, considerable deterioration occurs in the sharpness of the output image due to the scanner and the printer. As a corrective procedure, sharpness enhancement is conventionally performed by means of a Laplacian filter or an unsharp masking (USM). However, sharpening the image causes the side effect of increasing noise such as graininess and, hence, grainy pictures can be subjected to only moderate sharpness enhancement within a range where graininess deterioration is tolerated; as a result, it has been difficult to obtain image quality better than that of the original grainy picture.

Several methods have been proposed to process digital images such as to remove noisy graininess and enhance their sharpness. Removal of graininess involves an averaging or blurring technique but the blurred grainy pattern is not pleasing to the eye or fine structures of the object may be erased in an unnatural way. For these and other reasons, the conventional techniques for removing graininess are not suitable for application to high-quality pictures such as photographs.

Pictures such as those in photographs, printed documents, or on television's screens and from various kinds of copiers suffer diverse deterioration problems, i.e., sharpness deterioration due to optics such as a camera, graininess and sharpness deterioration inherent in photographic materials, or noise and sharpness deterioration that is added when the original picture such as a photograph or a printed document is digitized with an image input device. In order to deal with these difficulties, various methods have been proposed to process images such as to reduce noise and enhance their sharpness. Smoothing and coring are two common methods employed in the conventional image processing technology for removing graininess, whereas sharpness enhancement is implemented by unsharp masking (USM) or processing with a Laplacian or a high-pass filter. However, if graininess is suppressed by these conventional methods of graininess removal, artifacts that cause unnatural and strange impressions will occur or fine structures of the image that should inherently be kept intact will be suppressed along with the graininess.

See, for example, Japanese Domestic Announcement (kohyo) Nos. Sho 57-500311 and 57-500354, as well as P. G. Powell and B. E. Bayer, "A Method for the Digital Enhancement of Unsharp, Grainy Photographic Images" in the Proceedings of the International Conference on Electronic Image Processing, Jul. 26–28, 1982, pp. 179–183. According to the method proposed by Powell and Bayer in these references, suppression of graininess is accomplished by smoothing (with a low-pass filter) and sharpness enhancement is performed with an unsharp masking (high-pass filter). In the smoothing process, signal values for n×n pixels are multiplied by Gaussian or other type of weights such that the signals are smoothed to suppress graininess. In the sharpness enhancement process, picture signals for m×m pixels are first used to determine differential values by calculation from the central pixel towards the surrounding pixels and if any differential value is smaller than a preset threshold, the pixel of interest is regarded as representing graininess or noise and removed by coring and the remaining differential values which are greater than the threshold are summed up, multiplied by a constant more than 1.0 and added to the previously smoothed signals, thereby achieving sharpness enhancement.

In this process, the density contrast of grainy patterns decreases since they are blurred; on the other hand, blurred grainy patterns may become visually pronounced as they are mottles of randomly crowded grains that cause graininess (this phenomenon is commonly referred to as "mottling") and they will present unpleasing graininess. In addition, a preset threshold is used as a criterion for distinguishing graininess from the picture (this is the coring process), so image signals of low contrast may occasionally be erroneously taken as graininess and suppressed or removed along with the latter or discontinuity may occur at the boundary between the removed image signal and the enhanced picture signal to produce an unnatural artifact in the output image. This drawback occurs very frequently in fine images such as those of lawn and carpets and in images that represent texture as in fabrics and the result is an artifact that is visually quite unnatural and hence undesirable.

In the above-described prior art method of processing images to suppress their graininess while enhancing their sharpness, unsharp masking is employed to enhance the sharpness whereas blurring or smoothing is effected to suppress the graininess, such that a graininess (noise) signal and a contour signal are separated from the original picture by signal level and the contour signal is subjected to sharpness enhancement whereas the smoothed region is suppressed in graininess and the smaller signal is regarded as representing graininess and processed accordingly; as a result, signals representing the fine details of the picture which are close to signal levels representing graininess, namely, image signals representing the texture of cloths, the hair on the head and the like, will be suppressed along with the graininess, yielding visually unpleasing images that contain artifacts from image processing. In the conventional image processing technology where blurring or averaging is used as the method of suppressing graininess, a blurred grainy pattern is reduced in terms of density fluctuation; on the other hand, blurred grainy pattern spreads despite the small amount of density fluctuation and will be recognized as a visually unpleasing pattern, which stands out markedly in someone's face or skin as in portraits or in solid objects such as walls or sky.

In the prior art, a grainy (noisy) signal region and a contour region are separated from the original picture by signal level. Stated more specifically, the contour region and a flat region are discriminated on the basis of a signal indicating the difference between the original picture and a blurred image and the respective regions are processed with an unsharp masking, a Laplacian filter or other suitable means using different coefficients such that graininess is suppressed in the flat region whereas sharpness is enhanced in the contour region, thereby achieving graininess suppression without producing blurry edges. A problem with this technique is that discontinuity will occur at the boundary between the contour and grainy regions because the recognition and separation of these regions are performed indiscriminately with reference to a single threshold signal level.

It should also be mentioned that in the prior art which employs unsharp masking or a Laplacian filter for edge or sharpness enhancement, fringe (over shoot) such as Mach bands are most likely to occur along the contour or edges of the image, giving the visual impression of artificiality.

SUMMARY OF THE INVENTION

The present invention has been accomplished under these circumstances and it relates to an improvement of the technology of restoring images such as those in photographs, printed documents, or on television's screens, in digital still photographs and from various kinds of copiers so as to restore the camera-induced blur, the deterioration in noise and sharpness which is inherent in the original picture as exemplified by graininess and blur in photographic materials or the deterioration in noise and sharpness which has been added when digitizing the original picture with an image input device. As already mentioned, the prior art technology suffers three major problems: when a smoothing technique is applied to suppress graininess, the grain becomes blurred and mottling produces a visually unpleasing impression; low-contrast picture signals are mistaken for graininess and suppressed or entirely eliminated; and the boundary between a region from graininess has been removed and a region where sharpness enhancement has been done becomes discontinuous to produce unnatural artifacts in the output image. The purpose of the present invention is to provide a method and apparatus for processing digital images to suppress noise and enhance sharpness, by which graininess can be suppressed and image sharpness enhanced without causing any of the problems associated with the prior art.

In order to achieve the above-said purpose, according to the present invention, there is provided a method of processing digital images to suppress their noise and enhance their sharpness, comprising the steps of:

performing a sharpness enhancing process on original image data to generate sharpness enhanced image data;

performing a smoothing process on said original image data to generate smoothed image data;

subtracting the smoothed image data from said sharpness enhanced image data to extract a component consisting of both edges and noise;

performing nonlinear transformation on said edge/noise containing component to separate a noise component and performing a subdividing process on the resulting noise component to produce a subdivided noise component;

separately detecting an edge component from said original image data and determining weighting data for an edge region and a noise region from the detected edge component;

weighting said edge/noise containing component with the weighting data for said edge region to produce an edge enhancing component; and subtracting said subdivided noise component multiplied by a factor from said sharpness enhanced image data while adding said edge enhanced component multiplied by another factor to said sharpness enhanced image data so as to generate processed image data.

Also, according to the present invention, there is provided an apparatus for processing digital images to suppress their noise and enhance their sharpness, comprising:

sharpness enhancing means for generating sharpness enhanced image data from original image data;

smoothing means for generating smoothed image data from said original image data;

extracting means for extracting a component containing both edges and noise from said sharpness enhanced image data and the resulting smoothed image data;

weighting data computing means for calculating weighting data for the edge and noise regions of said original image date;

separating means for separating a noise component from said edge/noise containing component;

subdividing means for producing a subdivided noise component from the separated noise component;

means of weighting by the weighting data for said edge region so as to provide an edge enhancing component from said edge/noise containing component; and processed image data computing means for calculating processed image data from said sharpness enhanced image data, said subdivided noise component and said edge enhancing component.

According to the method and apparatus of the invention for processing digital images to suppress noise and enhance sharpness, the original picture is processed for sharpness enhancement so as to sharpen not only the picture but also the grain and noise contained in it and subsequently the edge portion of the image and its flat portion are subjected to regional splitting and the flat portion is regarded as a grainy region, from which a granular signal is detected and the granular signal to be suppressed is subdivided for selective removal. Thus, the invention yields an image of better quality that has been enhanced in sharpness in the edge portion and which has been suppressed in the grain of the grainy region.

According to the graininess suppressing method and apparatus of the invention, the grain component which has been enhanced in sharpness is detected and subjected to random modulation to produce a finely subdivided grainy component, which is subtracted from the sharpness enhanced image so as to suppress its graininess. The graininess achieved by this technique is spatially finer and lower in density contrast than it initially was. Since the grain of the original picture is sharpness enhanced and spatially refined, it can be as fine as is achieved when fine-grain emulsions are used to process silver halide photographic materials.

BRIEF DESCRIPTION OF THE DRAWINGS

FIG. 10 is a block diagram of an example of the image processing apparatus of the invention for implementing the invention method shown in FIG. 5.

DESCRIPTION OF THE PREFERRED EMBODIMENTS

The method and apparatus of the invention for processing digital images to suppress their noise and enhance their sharpness are now described below in detail with reference to the preferred embodiments shown in the accompanying drawings.

The method and apparatus start with performing sharpness enhancement and smoothing on the original image data to construct both sharpness enhanced image data and smoothed image data. Then, the smoothed image data are subtracted from the sharpness enhanced image data to extract a component where both edges and noise exist.

In the next step, the edge/noise component is subjected to nonlinear transformation, either directly or after weighting with the weighting data for the noise region which have been determined from the edge component preliminarily detected from the original picture data, so as to separate the noise component, which is subsequently subdivided to produce a subdivided noise component.

In a separate step, an edge component is preliminarily detected from the original image data as mentioned above; alternatively, an edge component as separated simultaneously with a noise component which is separated by directly performing nonlinear transformation on the edge/noise component determined from the original image data, and weighting data for the edge and noise regions are determined from the thus obtained edge component.

Subsequently, the edge/noise component is weighted by the weighting data for the edge region to generate an edge enhanced component. The subdivided noise component multiplied by a specified factor is subtracted from the sharpness enhanced image data whereas the edge enhanced component as multiplied by another specified factor is added to the same, thereby producing processed image data. This is how processed image data are ultimately obtained in accordance with the image processing method and apparatus of the invention.

The characterizing feature of the image processing method and apparatus of the invention is that both the edge region and the noise (grainy) region are subjected to sharpness enhancement and the noise region is subsequently separated from the edge region by nonlinear transformation and its grain is subdivided for selective removal. The method is by no means limited by the order of calculating weighting data from the detected edge component or nor does it depend upon whether the weighting operation using the weighting data is performed before the nonlinear transformation. Therefore, the following two specific embodiments given for each of the image processing method and apparatus of the invention should not of course be taken as limiting the scope of the invention.

To begin with, the first embodiment of the invention for processing images will be described below for each of the method and the apparatus.

Figure 1:
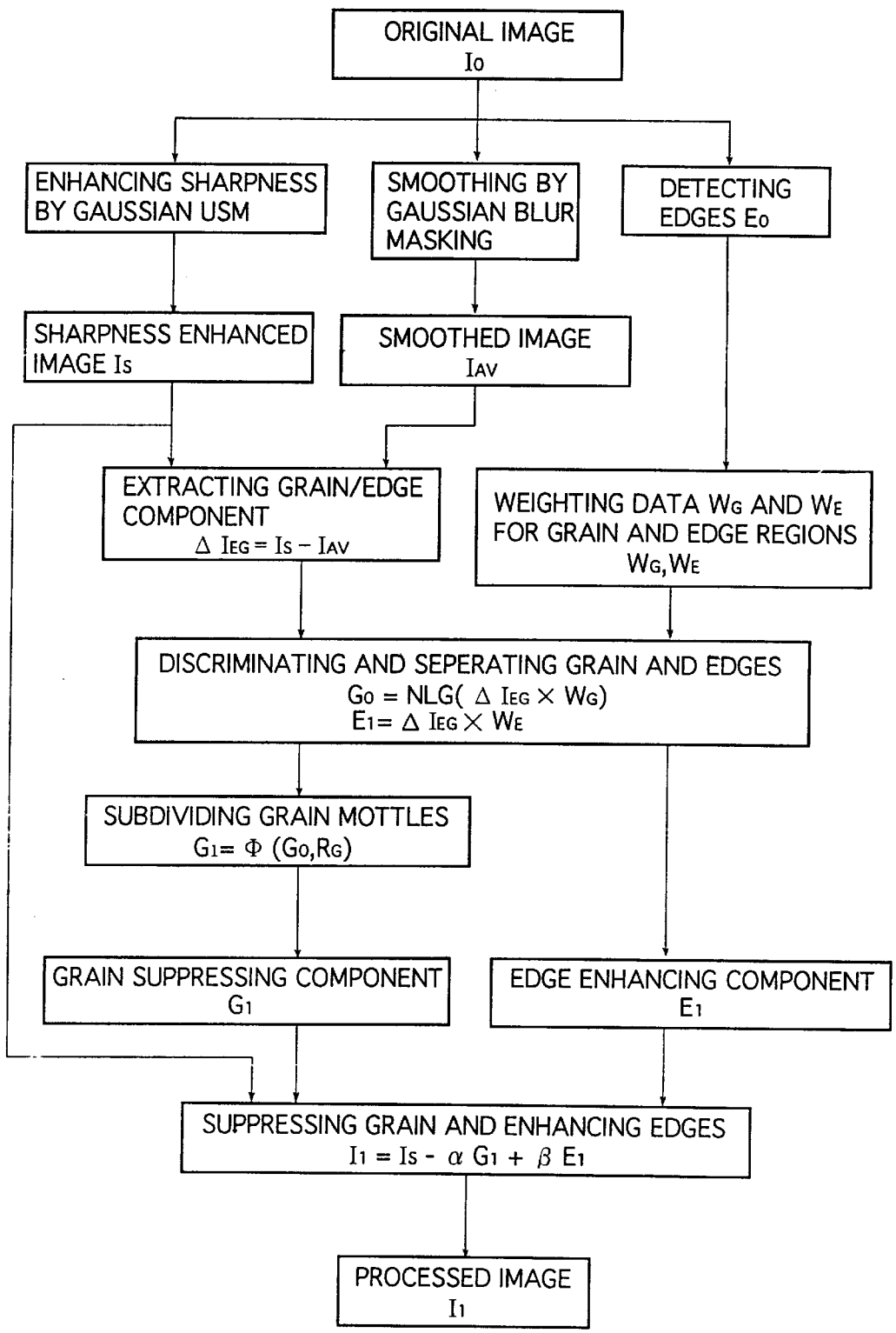
FIG. 1 is a flowchart for an embodiment of the method of the invention for processing digital images to suppress their noise and enhance their sharpness.
Figure 9:
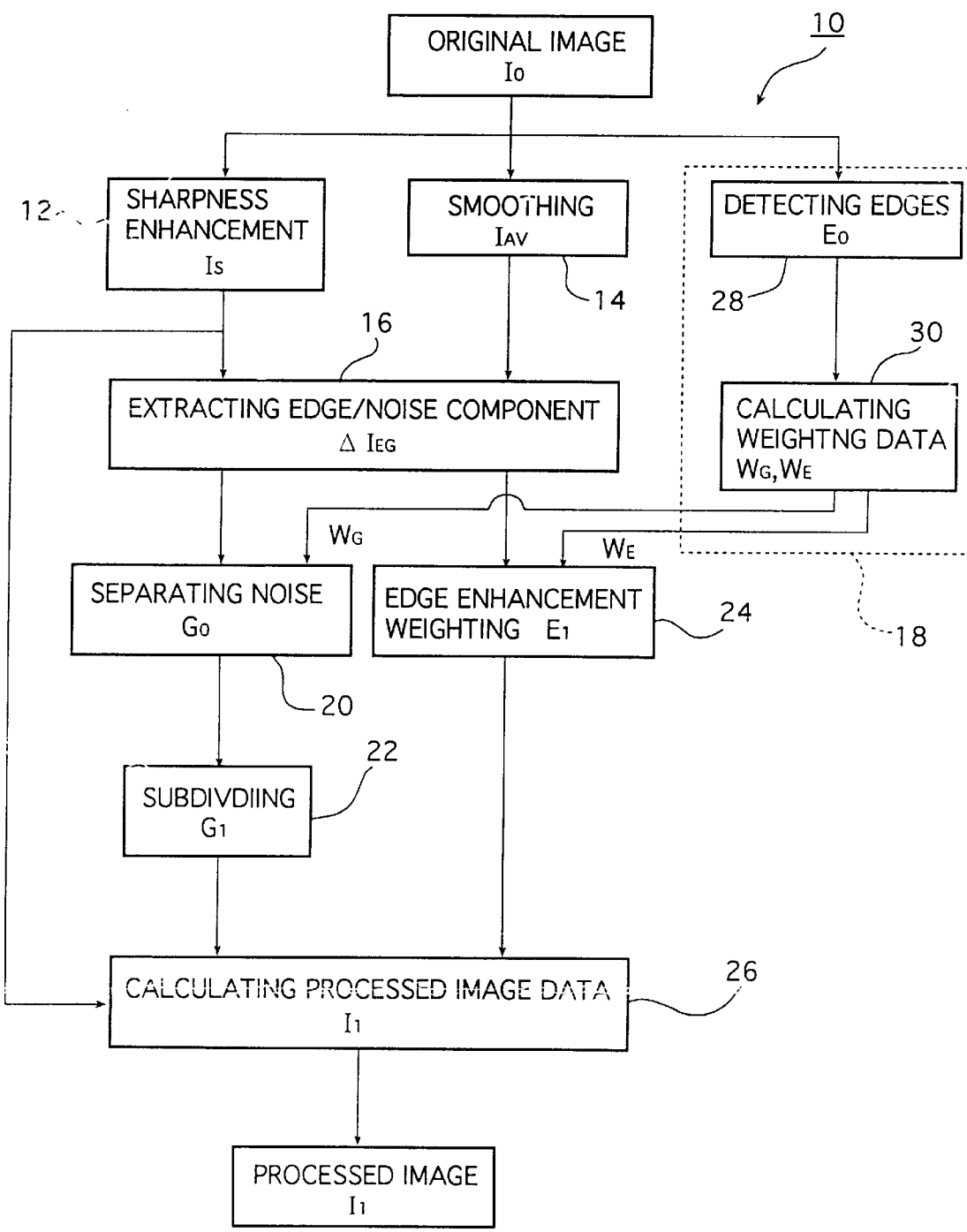
FIG. 9 is a block diagram of an example of the image processing apparatus of the invention for implementing the invention method shown in FIG. 1.

FIG. 1 is a flowchart for a processing algorithm according to the first embodiment of the invention. FIG. 9 is a block diagram of an exemplary image processing apparatus for implementing the image processing method according to the first embodiment of the invention. In the following description, graininess is considered as a typical example of the noise in a digital image.

First, for each pixel, a sharpness enhanced image $I_S$ and a smoothed image $I_{AV}$ are generated from the original image $I_0$ and a component in which both edges and grain (noise) exist is extracted; in other words, edge/grain containing fine image data $\Delta I_{EG}$ are generated. In a separate step, the edges of the object $E_0$ in the original image $I_0$ are directly detected from the original image $I_0$ and weighting data for the edge and grainy regions, $W_E$ and $W_G$, are determined.

Using the weighting data $W_E$ and $W_G$, nonlinear transformation (NLG) is performed on the already determined edge/grain containing fine image data $\Delta I_{EG}$ to achieve edge-grain separation. To be more specific, the edge/grain containing component $\Delta I_{EG}$ is multiplied (weighted) by the weighting data for the grainy region $W_G$ to generate a grainy component $G_0$ which contains edge information from the grainy region. The grainy component $G_0$ is refined by subdividing mottles to generate a subdivided grainy component, or a grain suppressing component $G_1$. Speaking of the edge component $E_0$, the edge/grain containing component $\Delta I_{EG}$ is multiplied (weighted) by the weighting data for the edge region $W_E$ to generate an edge enhancing component $E_1$ for the edge region.

Finally, the thus generated grain suppressing component $G_1$ is multiplied by a specified factor, say, a and subtracted from the previously determined sharpness enhanced image $I_S$ and, at the same time, the edge enhanced component $E_1$ as multiplied by another factor, say $\beta$ is added to $I_S$, thereby yielding a processed image $I_1$ which is sharpness enhanced in the edge region and grain suppressed in the flat region.

According to the most characterizing part of the invention, the graininess of the image is suppressed by a refining technique and the edges (contour) of the image and the grainy region are discriminated by nonlinear transformation, whereby the process of suppressing graininess and that of enhancing sharpness are distributed in a fuzzy manner. In other words, the boundary between the grainy region and the edge region is not as abrupt as occurs when a circuit is switched on and off. Instead, the two regions overlap and their relative proportions vary so smoothly that the boundary will not stand out markedly but will give a quite natural impression. In the method of the invention, the parameters that determine the degree of graininess suppression may be set automatically on the basis of the root mean square (RMS) of the density variations $\Delta D$ in the grainy and edge components.

The algorithm of the method of the invention uses to suppress image graininess and noise while enhancing sharpness may be applied to digitized image data for processing with a computer or a dedicated processor.

The image processing method according to the first embodiment of the invention which is shown in FIG. 1 can be implemented with the image processing apparatus of the invention which is indicated by 10 in FIG. 9. As shown, the apparatus 10 comprises means 12 for performing a sharpness enhancing process on the original image $I_0$, means 14 for performing a smoothing process on the original image $I_0$, means 16 for extracting an edge/noise containing component $\Delta I_{EG}$, means 18 for calculating weighting data $W_G$, and $W_E$ for the noise region and edge region, respectively, of the original image $I_0$, means 20 for separating a noise component $G_0$, from the edge/noise component $\Delta I_{EG}$ by means of the weighting data $W_G$, means 22 for subdividing the noise component $G_0$, means 24 for edge enhancement by weighting the noise/edge component $\Delta I_{EG}$ with the weighting data $W_E$, and means 26 for calculating processed image data $I_1$ from a sharpness enhanced image $I_S$, a subdivided noise component $G_1$ and an edge enhanced component $E_1$.

The weighting data calculating means 18 comprises means 28 for detecting an edge component $E_0$ from the original image $I_0$ and means 30 for calculating the weighting data for the edge and noise regions, $W_E$ and $W_G$, respectively from the edge component $E_0$.

The individual steps in the image processing method of the invention and the individual components of the image processing apparatus 10 for performing those individual steps will be described below briefly with reference to FIGS. 1 and 9, respectively.

1) Sharpness enhancing step by sharpness enhancing means 12

Using a Gaussian unsharp masking (USM), fairly extensive sharpness enhancement is performed on the original image $I_0$ so as to remedy the blur from the image input/output system and to provide better sharpness than is achieved on optical prints; this step yields a sharpness enhanced image is.

2) Smoothing step by smoothing means 14 and the step of extracting edge/grain component by edge/grain component extracting means 16

A smoothed image $I_{AV}$ is generated from the original image $I_0$ by such means as averaging or using a blurring mask; the smoothed image $I_{AV}$ is subtracted from the sharpness enhanced image $I_S$ to generate edge/grain containing fine image data $\Delta I_{EG}$ according to the following equation (1):

$$\Delta I_{EG}=I_S-I_{AV} \qquad (1)$$

3) Step of calculating weighting coefficients for the edge and grainy regions by weighting data computing means 18

The edges of the object, $E_0$, in the original image $I_0$ are detected directly from the original image $I_0$ by edge detecting means 28 using a suitable technique such as a local variance method. Using the detected edges $E_0$, weighting functions (data) for the edge and grainy regions, $W_E$ and $W_G$, are determined by computing means 30. Since $W_E+W_G=1.0$, only the weighting data for the grainy region, $W_G$, may be determined and the weighting data for the edge region, $W_E$, are calculated by subtracting $W_G$ from 1.0, or vice versa.

4) Step of discriminating and separating edges and grain by separating means 20 and edge enhancement weighting means 24

Using the weighting data $W_G$ for the grainy region and the weighting data $W_E$ for the edge region, the edges and grain are separated from the edge/grain containing fine image data $\Delta I_{EG}$ by applying a nonlinear transformation function (NLG). The grainy component $G_0$ and the edge component $E_1$ can be determined by the following equations (2) and (3), respectively, provided that the edge component $E_1$ is determined as an edge enhanced component $E_1$:

$$G_0=NLG(\Delta I_{EG}\times W_G) \qquad (2)$$

$$E_1=\Delta I_{EG}\times W_E \qquad (3)$$

Multiplication by the weighting data for the grainy component, $W_G$, which is on the right side of equation (2) may be performed after the nonlinear transformation, as expressed by the following equation (2'):

$$G_0=NLG(\Delta I_{EG})\times W_G \qquad (2')$$

5) Step of subdividing grain mottles by subdividing means

The grainy component $G_0$ is refined by a mottle subdividing process using Gaussian random numbers $R_G$ in accordance with the following equation (4), thereby generating a grain suppressing component $G_1$:

$$G_1=\Phi(G_0, R_G) \qquad (4)$$

6) Step of suppressing graininess and enhancing edges (sharpness), or step of calculating final processed image, by processed image data computing means 26

The already determined sharpness enhanced image $I_S$, the grain suppressing component $G_1$ determined in step 5) and the edge enhancing component $E_1$ determined in step 4) are processed by the following equation (5) to yield a processed image $I_1$ in which the edge region of the original image $I_0$ has been sharpness enhanced whereas the flat region such as the grainy region has been suppressed in graininess. In equation (5), α and β are parameters for adjusting the magnitude of the processing:

$$I_1 = I_S - \alpha G_1 + \beta E_1 \qquad (5)$$

In the illustrated case, the grainy component $G_0$ and the edge enhancing component $E_1$ are generated in step 4) of discriminating and separating the edges and grain. This is not the sole case of the invention and step 4) may be modified such that only the grainy component $G_0$ is generated in the step whereas the edge enhanced component $E_1$ is generated in the final step 6) of edge enhancement.

In the illustrated case, the sharpness enhanced image $I_S$ is operated upon by the grain suppressing component $G_1$ and the edge enhancing component $E_1$ simultaneously in the final step of suppressing graininess and enhancing sharpness. However, this is not the sole case of the invention and the subtraction of the grain suppressing component $G_1$ and the addition of the edge enhancing component $E_1$ may be performed separately as exemplified by subtracting $G_1$ from the sharpness enhanced image $I_S$ in step 5) of subdividing grain mottles.

The pictures to be processed by the image processing method of the invention are not limited to any particular kinds and they include not only pictures on hard copies such as photographs, printed documents, digital still photographs and outputs from copiers but also pictures on soft copies such as those displayed on television's screen, video screens, computer's CRT and liquid-display devices.

In the foregoing description, graininess has been taken as a typical example of the noise that need be suppressed in the pictures just mentioned above. However, this is not the sole case of the invention and it may be applicable to any types of noise that come out grainy in reproduced images, as exemplified by the noise inherent in the original picture due, for example, to camera-induced blurs and the grain and blurring of a photographic material, the noise that is added when the original picture is read with an image input device such as a scanner and converted to a digital image, and the noise that comes in when image is picked up with a video camera, an electronic still camera or a digital camera and converted to a digital image.

The individual steps in the image processing method of the invention which are performed with the individual components of the apparatus 10 will now be described below in greater details.

1) To begin with, the step of sharpness enhancement by sharpness enhancing means 12 is described.

Two well known methods of enhancing the sharpness of a picture are by unsharp masking (USM) and Laplacian filtering. If the deterioration in the sharpness of the original image is not too great, these methods may effectively be used in the invention to enhance the sharpness of the picture.

Unsharp masking is a method of determining a sharpness enhanced image $I_S(x,y)$ by the following equation (6), in which the original image $I_0(x,y)$ is averaged or blurred to yield an image $<I_0(x,y)>$ which is subtracted from $I_0(x,y)$ to give an edge enhanced component $I_0(x,y)-<I_0(x,y)>$, which is subsequently multiplied by a factor a and added to the original image $I_0(x,y)$:

$$I_S(x,y) = I_0(x,y) + a[I_0(x,y) - <I_0(x,y)>] \qquad (6)$$

where a is a constant for adjusting the degree of sharpness enhancement and x,y are coordinates representing the position of a pixel of interest in the picture.

Laplacian filtering is a method of enhancing the sharpness of an image $I_0(x,y)$ by subtracting a second partial derivative (Laplace operator or Laplacian) $\nabla^2 I_0(x,y)$ from the original image, as expressed by the following equation (7):

$$I_S(x,y) = I_0(x,y) - \nabla^2 I_0(x,y) \qquad (7)$$

Common specific examples of sharpness enhancement by Laplacian filtering are the following 3×3 coefficient arrays:

$$\begin{matrix} 0 & -1 & 0 \\ -1 & 5 & -1 \\ 0 & -1 & 0 \end{matrix} \quad \begin{matrix} -1 & -1 & -1 \\ -1 & 9 & -1 \\ -1 & -1 & -1 \end{matrix} \quad \begin{matrix} 1 & -2 & 1 \\ -2 & 5 & -2 \\ 1 & -2 & 1 \end{matrix} \qquad (8)$$

With these coefficient arrays, particularly when intense sharpness enhancement is applied, an unnatural contour is most likely to occur along the edges of the picture. In order to minimize this problem, unsharp masking is preferably performed in the invention using a normal distribution (Gaussian) blurring function as expressed by the following equation (9):

$$G(x,y) = (1/2\pi\sigma^2)\exp[-(x^2+y^2)/2\sigma^2] \qquad (9)$$

where $\sigma^2$ is a parameter representing the spread of the normal distribution function.

By ensuring that the ratio of the value of G(x,y) at a mask end $X=X_1$ to the value of the same function at the mask center x=0, which is expressed by the following equation:

$$G(x_1,0)/G(0,0) = \exp[-x_1^2/2\sigma^2] \qquad (10)$$

is adjusted to lie between 0.1 and 1.0, a 3×3 unsharp mask can provide the desired sharpness. If the value of equation (10) is adjusted to be close to 1.0, one can generate a mask that is substantially identical to the center Laplacian filter in equation (8).

The mask sharpness can also be varied by adjusting the mask size; for example, the spatial frequency range for sharpness enhancement can be substantially altered by using masks of varying size such as 5×5, 7×7 and 9×9.

The function expressing the mask may be other than the one of a normal distribution, for example, an exponential function given by the following equation (11):

$$E(x,y) = \exp[-(x^2+y^2)^{1/2}/a] \qquad (11)$$

where a is a parameter which has the same meaning as $\sigma^2$ in equation (9) and represents the spread of the unsharp mask.

By ensuring that the ratio of the value of X(x,y) at a mask end $x=x_1$ to the value at the mask center x=0, which is expressed by the following equation:

$$E(x_1,0)/E(0,0) = \exp[-x_1/a] \qquad (12)$$

is adjusted to lie between 0.1 and 1.0, a 3×3 unsharp mask can provide the desired sharpness. When $E(x_1,0)/E(0,0)=0.3$, the mask of an exponential function according to equation (11) may numerically assume the following values:

$$\begin{pmatrix} 0.18 & 0.30 & 0.18 \\ 0.30 & 1.00 & 0.30 \\ 0.18 & 0.30 & 0.18 \end{pmatrix} \quad (13)$$

From this mask, an unsharp mask having the following values of the respective elements may be calculated:

$$\begin{pmatrix} -0.12 & -0.22 & -0.12 \\ -0.21 & 2.32 & -0.21 \\ -0.12 & -0.21 & -0.12 \end{pmatrix} \quad (14)$$

Using this unsharp mask, one can determine a sharpness enhanced image $I_S(x,y)$ from the original image $I_0(x,y)$. It should be noted that the unsharp mask and the method of sharpness enhancement that can be employed in the invention are by no means limited to the examples described above and any other known unsharp masks and methods of sharpness enhancement by means of spatial frequency filter and the like may of course be applicable.

2) We next describe the smoothing step by smoothing means 14.

Smoothing techniques can be classified as two processes, one being directed to a real space domain and the other to a spatial frequency domain. Processes directed to a real space domain include i) summing up the values of successive adjacent pixels, calculating the average of those values and substituting the average; ii) multiplying the values of respective pixels by weighting coefficients, for example, normal distribution functions and determining the weighted average; and iii) nonlinear processing as with a median filter. Processes directed to a spatial frequency domain include the multiplication by a low-pass filter. The averaging process using weighting coefficients may be expressed by the following equation (15):

$$I_{AV}(x, y) = \frac{1}{n^2} \sum_{i=1}^{n} \sum_{j=1}^{n} w(i, j) I_0(x + i - n/2 - 1/2, y + j - n/2 - 1/2) \quad (15)$$

where n is an averaging mask size and w is a weighting coefficient. If w=1.0, a simple mean is obtained.

The following description of the invention assumes the use of a process directed to a real space domain, particularly, the averaging of values weighted by weighting coefficients of a normal distribution type. It should, of course, be noted that this is not the sole case of the invention. The processing mask to be used in the illustrated case is preferably an array of n×n pixels as set forth below. Specifically, masks of sizes on the order of 3×3, 5×5, 7×7 and 9×9 pixels are preferably employed:

$$\begin{pmatrix} w_{11} & w_{12} & w_{13} & \cdots & w_{1n} \\ w_{21} & w_{22} & w_{23} & \cdots & w_{2n} \\ w_{31} & w_{32} & w_{33} & \cdots & w_{3n} \\ \vdots & \vdots & \vdots & & \vdots \\ w_{n1} & w_{n2} & w_{n3} & \cdots & w_{nn} \end{pmatrix} \quad (16)$$

An exemplary mask of 9×9 pixels is shown below by formula (17) which is normalized to 1.0 at the central value. In actual processing, the values of the respective pixels are so selected that their total sum is 1.0.

$$\begin{pmatrix} 0.09 & 0.15 & 0.22 & 0.28 & 0.30 & 0.28 & 0.22 & 0.15 & 0.09 \\ 0.15 & 0.26 & 0.38 & 0.47 & 0.51 & 0.47 & 0.38 & 0.26 & 0.15 \\ 0.22 & 0.38 & 0.55 & 0.69 & 0.74 & 0.69 & 0.55 & 0.38 & 0.22 \\ 0.28 & 0.47 & 0.69 & 0.86 & 0.93 & 0.86 & 0.69 & 0.47 & 0.28 \\ 0.30 & 0.51 & 0.74 & 0.93 & 1.00 & 0.93 & 0.74 & 0.51 & 0.30 \\ 0.28 & 0.47 & 0.69 & 0.86 & 0.93 & 0.86 & 0.69 & 0.47 & 0.28 \\ 0.22 & 0.38 & 0.55 & 0.69 & 0.74 & 0.69 & 0.55 & 0.38 & 0.22 \\ 0.15 & 0.26 & 0.38 & 0.47 & 0.51 & 0.47 & 0.38 & 0.26 & 0.15 \\ 0.09 & 0.15 & 0.22 & 0.28 & 0.30 & 0.28 & 0.22 & 0.15 & 0.09 \end{pmatrix} \quad (17)$$

Using a mask of this kind, one can determine a smoothed image $I_{AV}(X(Y)$ from the original image $I_0(x,y)$. Needless to say, the methods described above are not the only way to perform smoothing in the present invention and any other known smoothing methods are equally applicable.

3) We next describe the step of extracting a component containing both the grain and edges.

The difference between the sharpness enhanced image $I_S(x,y)$ obtained in step 1) and the smoothed image $I_{AV}(x,y)$ obtained in step 2) is determined and extracted as a grain/edge component $\Delta I_{EG}(x,y)$ according to the following equation:

$$\Delta I_{EG}(x,y) = I_S(x,y) - I_{AV}(x,y) \quad (18)$$

4) We will now describe the step of edge detection by edge detecting means 28 in weighting data computing means 18, as well as the step of calculating weighting coefficients for the edge and grainy regions by computing means 30. In the following description, detection of edges by a local variance method is assumed as a typical example but this is not the sole case of the invention.

(1) Preliminary processing: density conversion

The first step of edge detection is multiplying the density values $D_R$, $D_G$ and $D_B$ of R, G and B, respectively, in the original image $I_0(x,y)$ by weighting factors r, g and b to convert them into a visual density $D_V$ according to the following equation (19):

$$D_V = (rD_R + gD_G + bD_B)/(r+g+b) \quad (19)$$

Figure 2:
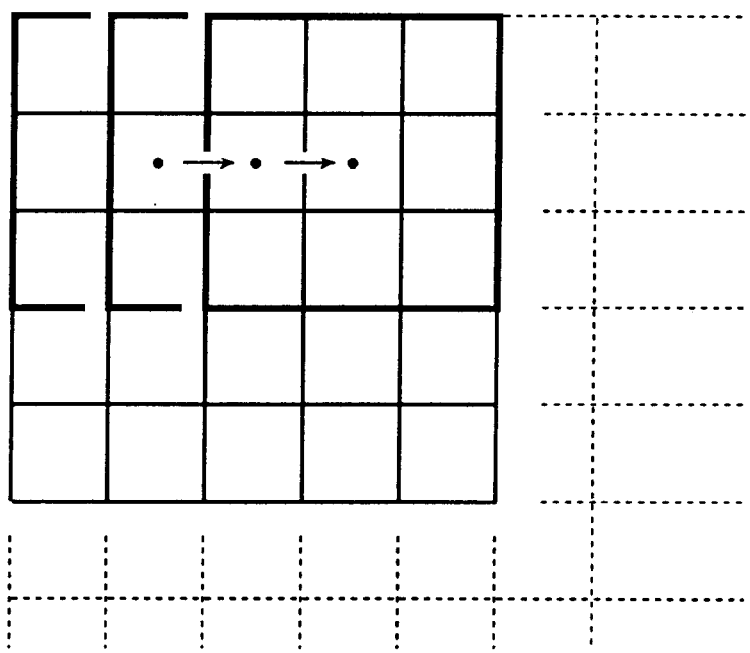
FIG. 2 is an illustration of a method of moving a square pixel array in edge detection that is performed by a local variance method in the image processing method of the invention.

The weighting factors r, g and b may take on values such as 4, 5 and 1. The purpose of conversion to the visual density $D_V$ is to reduce graininess and noise having no correlationship between R, G and B so as to improve the precision of edge detection. The array to be used in the preliminary processing is preferably of a size of about 5×5 or 7×7 pixels and this is to ensure that in the next step (2), the variations in the densities of pixels within the array can be calculated with a smaller array, say, of about 3×3 pixels being successively moved as shown in FIG. 2.

The weighting factors r, g and b for edge detection may be determined by the following way. In principle, they are preferably set to optimal values based on the idea that image data for a color of greater contribution that stands out when observed visually (one might as well consider that the relative conspicuity of the color corresponds to the associated spectral luminous efficiency) have greater weighting factors. Generally, empirical weighting factors have been determined on the basis of experiments for visual evaluation and the following values are available as a general finding (which is documented in Takafumi Noguchi, "Relating Granularity to Graininess", Journal of The Society of Photographic Science and Technology of Japan, 57(6), 415 (1994); depending on colors, the reference sets forth numerical figures close to the ratios listed below):

r:g:b=3:6:1 r:g:b=4:5:1 r:g:b=2:7:1

A preferred range of the values to be taken by the ratio r:g:b may be specified as follows: assuming r+g+b=10.0 and b=1.0, g is preferably in the range of 5.0 7.0, provided that r=10.0−b−g.

(2) Edge detection by a local variation method

As shown in FIG. 2, an array of $n_E \times n_E$ pixels selected from the image data of visual density $D_V$ is moved as the variations in the densities of pixels within the preprocessing array are successively calculated by the following equation (20), with the local standard deviations a for successive positions of move being taken as local variances, whereby the edges of the object of interest in the picture are detected. The size of the moving pixel array, $n_E \times n_E$, may be determined as appropriate for the precision of detection and the load on calculations; a preferred array size is on the order of 3×3 or 5×5 pixels:

$$\sigma(x, y) = \left\{ \frac{1}{n_E^2} \sum_i \sum_j (D_{ij} - \langle D \rangle)^2 \right\}^{1/2} \quad (20)$$

where $D_{ij}$ is the density of the array of $n_E \times n_E$ pixels which is used in calculating local variances, and <D> is the average density of the array and expressed by:

$$\langle D \rangle = \frac{1}{n_E^2} \sum_i \sum_j D_{ij} \quad (21)$$

(3) Calculating weighting coefficients for the edge and grainy regions

In order to determine the weighting coefficient for the edge region, $W_E(x,y)$, and the weighting coefficient for the grainy region, $W_G(x,y)$, from the local variance $\sigma(x,y)$ expressed by equations (20) and (21), the following equations (22) and (23) involving an exponential function may be employed:

$$W_E(x,y) = 1\exp[-\sigma(x,y)/a_E] \quad (22)$$

$$W_G(x,y) = 1 - W_E(x,y) \quad (23)$$

where $a_E$ is a factor for converting the value of local variance $\sigma(x,y)$ into the weighting coefficient $W_E(x,y)$ and if the threshold of $\sigma(x,y)$ assigned to $W_E=0.5$ is written as $\sigma_T$, $a_E$ is given by $a_E = -\sigma_T / \log_e(0.5)$. The value of $\sigma_T$ must be adjusted to an appropriate value depending upon the intensity of granularity and the magnitude of the signal for the contour of the object. With a color image of 8 bits (256 gradations) for each color, $\sigma_T$ preferably takes values within a range of 10–100. The time of calculations required to effect conversion from $\sigma(x,y)$ to $W_E(x,y)$ can be shortened by using look-up tables (LUT).

The formula for determining the weighting coefficient for the edge region, $W_E(x,y)$, is by no means limited to equation (22) and other formulae may be substituted, as exemplified by the following Gaussian function:

$$W_E(x,y) = 1 - \exp\{-[\sigma(x,y)]^2/a_{E1}^2\}$$

where $a_{E1}$ is a coefficient for converting $\sigma(x,y)$ into $W_E(x,y)$ and if the threshold of $\sigma(x,y)$ assigned to $W_E=0.5$ is written as $\sigma_T$, $a_{E1}^2$ is given by $a_{E1}^2 = -\sigma_T^2/\log_e(0.5)$. With a color image of 8 bits (256 gradations) for each color, $\sigma_T$ preferably takes values within a range of 10–100.

It should be noted here that the above-described local variance method is not the only way to be used for edge detection in the present invention and other edge detecting techniques may be employed, such as ones based on first and second differentials and which are each divided into subgroups as follows.

The method based on spatial first differentials may employ the following operators, a differential edge extracting operator and a template operator. Examples of the differential edge extracting operator include Prewitt's operator, Sobel's operator, and Roberts' operator which may be expressed by the following equation:

$$g(i,j) = \{[f(i,j) - f(i+1,j+1)]^2 + [f(i+1,j) - f(i,j+1)]^2\}^{1/2}$$

Examples of the template operator include Robinson's operator using a 3×3 template equivalent to edge patterns for 8 directions, as well as Kirsh'es operator.

The method based on spatial second derivatives may employ a Laplacian. This method accentuates noise, so it is often implemented by first applying a blurring process of a normal distribution type before edge detection is performed.

5) We next describe the process of weighting the grain and edges in the step of discriminating and separating the edges and grain.

To discriminate and separate the grainy and edge components, the characteristics of the grain and edges are utilized. In a spatial domain, the grain occurs in the entire part of the film or the picture and it is more conspicuous in the flat area of the object than along its contour and edges. On the other hand, the edges of the picture mainly occur along the contour of the object and in a fine structure on its surface. In a density domain, the grain is mainly composed of the grain of the photographic material used in taking the original picture, so it has in most cases a small density difference as indicated by a dashed line in FIG. 3. On the other hand, the edges of the picture depend on the contrast of the object and, as indicated by a solid line in FIG. 3, their density difference varies greatly with the picture and range from a very small difference to a significantly great one.

6) We next describe the step of discriminating and separating the grain and edges by separating means 20.

For discriminating and separating the grain and edges. they are first subjected to regional splitting by making use of their spatial characteristics. By multiplying the grain/edge density value $\Delta I_{EG}(x,y)$ with the weighting data for the grainy region, $W_G(x,y)$, that has been determined using the edges of the object as detected from the original picture, the edge information can be reduced to yield a signal $\Delta I_G(x,y)$ having an increased proportion of the grain information:

$$\Delta I_G(x,y) = W_G(x,y) \times \Delta I_{EG}(x,y) \quad (24)$$

Figure 3:
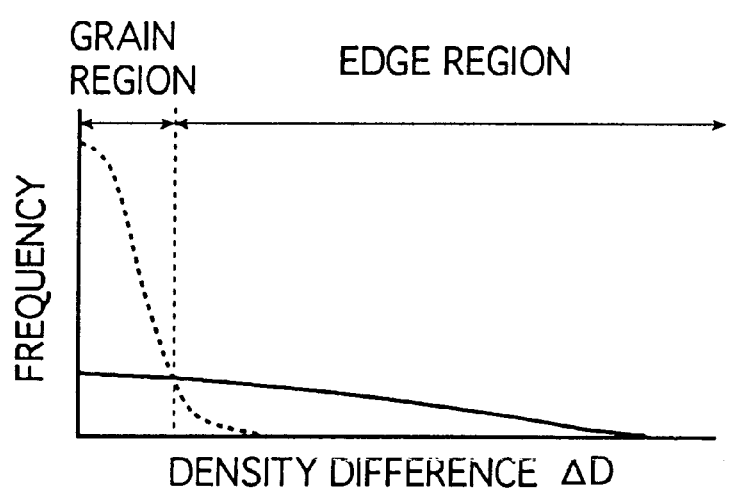
FIG. 3 is an illustration of a characteristic frequency distribution of a density difference component for the grainy and edge regions of a picture which is presented for use in explaining the discrimination and separation of those regions in the image processing method of the invention.

Subsequently, image information concerning graininess is separated from image information about the edges by making use of the characteristics in the density domain. As shown in FIG. 3, a signal with a small density difference is mainly composed of a grainy component and a small portion of an edge signal whereas a signal of a great density difference is mainly composed of an edge component and a small portion of a grainy component with a comparatively large density difference; hence, the relative magnitude of density difference can be used to effect grain and edge separation. Separation of the grainy component G(x,y) is performed using a LUT for nonlinear transformation (see FIG. 4) as expressed by the following equation (25):

$$G(x,y)=LUT(\Delta D(x,y)) \quad (25)$$

where LUT is given by:

$$LUT(\Delta D)=\Delta D \times \exp[-(\Delta D)/a_G] \quad (26)$$

where $a_G^2$ is a constant determined from a threshold $G_T$ for differentiating the density variation of the grain and expressed by:

$$a_G^2 = -G_T^2/\log_e(\tfrac{1}{2}) \quad (27)$$

The threshold $G_T$ in equation (27) is such that grain/edge density variations $\Delta I_{EG}(x,y)$ below this value are regarded to be grainy. As will be readily understood from equation (26) and FIG. 4, the grain and edge separation is not as sharp as is effected by turning a switch on and off at that threshold but the grain to be separated decreases in accordance with a LUT profile that gradually decreases in value with the increasing density variation. Therefore, the edges also occur together with the grain but in a gradually decreasing proportion.

If the nonlinear transformation LUT is written as a nonlinear transformation function NLG and the edge/grain component as $\Delta I_{EG}(x,y)$, then the grainy component $G_0(x,y)$ can be expressed as follows from equations (24) and (25):

$$G_0(x,y)=NLG\{\Delta I_{EG}(x,y) \times W_G(x,y)\} \quad (28)$$

Multiplication by the weighting data for the grainy component, $W_G(x,y)$, which is on the right side of equation (28) may be performed after the nonlinear transformation, as expressed by the following equation (28'):

$$G_0(x,y)=NLG\{\Delta I_{EG}(x,y)\} \times W_G(x,y) \quad (28')$$

This is how the grainy component $G_0(x,y)$ is determined. The calculation of the edge component to be performed in step 6) will be described several paragraphs below.

The threshold $G_T$ for discriminating the grain is preferably selected for an optimal value in accordance with the magnitude of the grain and noise in the picture to be processed and with the degree of the sharpness enhancement to be performed. Since the discrimination of graininess is effected on the image after sharpness enhancement, the grain of interest differs from that of the initial image in that it has become sharper as the result of sharpness enhancement and that it has an increased density variation. Therefore, in the process of suppressing graininess, the density variations of surrounding n×n pixels is referenced to express the magnitude of grain after sharpness enhancement in terms of a physical value such as RMS granularity a and the threshold for grain discrimination $G_T$ will be determined on the basis of that physical value. A specific procedure of determining $G_T$ is described below.

The graininess of color photographic materials is commonly measured with a micro-densitometer having a measuring aperture of 48 $\mu\phi$ and expressed in terms of RMS granularity. With ordinary or typical color negative films such as Super G ACE 100, 200, 400 and 800 (all manufactured by Fuji Photo Film Co., Ltd.), the graininess is in the range of 4–5 (RMS granularity $\sigma_{48}$ times 1000). If digitization is performed by scanning the film with the aperture area A, the granularity of the film for that aperture area, $\sigma_{SC}$, can be calculated from the RMS granularity $\sigma_{48}$ by the following equation (29) using $S=\sigma\sqrt{A}$ which is the well known formula of Selwyn granularity:

$$\sigma_{SC} = \sigma_{48}\sqrt{A_{48}}/\sqrt{A_{SC}} \quad (29)$$

where $A_{48}$ is the area of the 48 $\mu\phi$ aperture. If the film's granularity is 4 and the digitized scanning aperture is 12 $\mu\phi$ (aperture area is $A_{12}$), $\sigma_{SC}$ is calculated as follows:

$$\sigma_{SC} = \sigma_{48}\sqrt{A_{48}}/\sqrt{A_{12}} = 0.016 \quad (30)$$

provided that the blur is of the magnitude whether it is due to the optics or the scanning aperture.

If the granularity $\sigma_{SC}$ increases by a factor of p upon sharpness enhancement, the following equation will hold:

$$\sigma_{SC}' = p\sigma_{SC} \quad (31)$$

The graininess discriminating threshold $G_T$ preferably takes a value proportional to the granularity of the image to be processed, as expressed by $G_T=k_G\sigma_{SC}'$, where $k_G$ is a constant preferably between 1.0 and 3.0. As the value of $G_T$ becomes greater than $\sigma_{SC'}$, the more complete is the discrimination of granularity but, on the other hand, the greater is the probability that information about a low-contrast object which is close to grainy density variations is erroneously interpreted as representing graininess. Conversely, if the value of $G_T$ becomes smaller than ascot the misinterpretation of information about the object is less likely to occur but, on the other hand, graininess of great density variations is no longer effectively eliminated and coarse graininess will remain in the processed image.

7) We next describe the step of subdividing grains mottles by subdividing means 22.

A grainy pattern in the image to be processed consists of fine density variations, which can be considered as the combination of two variations, one being the variation in the amplitude of a density value and the other being the spatial variation. The purpose of image processing directed to graininess suppression is to make the grainy pattern less marked to the eye. Graininess can of course be suppressed by reducing both the density amplitude and the spatial magnitude but, at the same, the visual effect of improvement is no longer discernible if the amplitude and the magnitude both become smaller than certain levels. However, with digital images, the pixel size determines a spatial minimal unit whereas the density resolution of data (in case of 8-bit image data, the density resolution is equivalent to a 1-bit density difference) defines a minimal unit of density amplitude, and values smaller than these minimal units are physically impossible to realize.

Mottling spatially varies in size and with the smaller mottles, fine signal and density variations occur on a pixel basis but with the larger mottles, signal and density variations not only occur in the pixel of interest but also span several surrounding pixels. The signals that vary on a pixel basis cannot be subdivided any further but large mottles spanning multiple pixels can be subdivided to become visually less pronounced.

To reduce mottling, the grain component $G_0(x,y)$ is first detected and multiplied by a subdividing mask $R(x,y)$ composed of subdividing random numbers or a fine pattern such as a grid pattern, thereby yielding a subdivided grain component, or a grain suppressing component:

$$G_1(x,y)=R(x,y) \times G_0(x,y) \quad (32)$$

Then, the grain suppressing component $G_1(x\,y)$ is subtracted from the image to be suppressed in graininess, $I_S(x,y)$, according to the following equation (33):

$$I_{10}(x,y)=I_S(x,y)-\alpha G_1(x,y) \quad (33)$$

where α is a coefficient for adjusting the degree of graininess suppression.

Thus, the process of graininess suppression can be considered as consisting of the following two steps, generation of a grain subdividing mask and grain subdividing.

(1) Step of generating a grain subdividing mask:

A grain subdividing mask may have any pattern such as one of random numbers, as well as a dot-like pattern (e.g. ordinary two-dimensional dots, a one-dimensional frequency screen or a FM screen) and an error-distributed pattern. Among these patterns, one of random numbers is preferred since it is free from artifacts such as moiré.

Various kinds of random numbers are available, such as uniform random numbers, normal random numbers, Poisson random numbers and binomial random numbers, and normal random numbers which resemble fluctuations occurring in nature are preferred. The fluctuations in nature are said to be best simulated by 1/f fluctuations, which hence is suitable for the purpose under consideration.

Generation of random numbers comprises generating one random number for each of the pixels in the picture according to the following equation (34):

$$R(x,y)=Ran(i) \quad (34)$$

where Ran(i) is a random number; i=1, 2, . . . N; and N is the total number of pixels in the image. Normal random numbers have a probability density distribution as expressed by the following equation (35), with $\sigma^2$ representing the variance for the mean μ:

$$f(p) = \frac{1}{(2\pi)^{1/2}\sigma} \exp[-(p-\mu)^2/2\sigma^2] \quad (35)$$

By adjusting the value of μ, the degree of subdividing the grain, particularly the variation in the amplitude of the subdividing mask, can be controlled. The value of μ is preferably in the range from about 10 to about 1000, more preferably in the range from about 10 to about 500.

(2) Step of subdividing the pattern of density variations in graininess:

The detected graininess data $G_0(x,y)$ is multiplied by the above-mentioned random numbers R(x,y) to calculate the subdivided graininess data (grain suppressing component) $G_1(x,y)$ in accordance with the following equation (36), where $R_G(x,y)$ represents Gaussian (normal) random numbers:

$$G_1(x,y)=R_G(x,y)\cdot G_0(x,y) \quad (36)$$

The subdivided grainy component $G_1(x,y)$ is a finely modulated produce of the grainy component $G_0(x,y)$.

This is how the subdivided grain component $G_1(x,y)$ is determined.

8) We next describe the process of suppressing and removing graininess in the final step of grain suppression and edge enhancement by processed image data computing means 26.

The subdivided grain component $G_1(x,y)$ obtained by equation (36) is subtracted from the sharpness enhanced image $I_S(x,y)$ in accordance with the following equation (37) so as to suppress graininess:

$$I_{10}(x,y)=I_S(x,y)-\alpha G_1(x,y) \quad (37)$$

where α is a coefficient for adjusting the degree of graininess suppression. This process suppresses the graininess that has deteriorated upon sharpness enhancement. The grain suppression occurring at this stage is such that the greater part of coarse patterns such as mottling is removed to leave only a portion of the subdivided grainy patterns intact, thereby producing a grainy appearance which seems to have been visually refined.

9) Lastly, we describe the process of enhancing edges by edged enhancement weighting means 24.

The grain/edge component $\Delta I_{EG}(x,y)$ obtained in step 3) and expressed by equation (18) is multiplied by the weighting data for the edge region, $W_E(x,y)$, to calculate an edge enhancing component $E_1(x,y)$ in accordance with the following equation (38):

$$E_1(x,y)=W_E(x,y)\times \Delta I_{EG}(x,y) \quad (38)$$

The thus obtained edge enhancing component $E_1(x,y)$ is added to the grain suppressed image $I_{10}(x,y)$ obtained by equation (37) to yield the final processed image $I_1(x,y)$, where β is a coefficient for adjusting the degree of addition of the edge enhancing component:

$$I_1(x,y)=I_{10}(x,y)+\beta E_1(x,y) \quad (39)$$

The purpose of sharpness enhancement was substantially attained by the process represented by equation (6) and the edge enhancement performed in the step under discussion, which is intended to restore the edge component that was slightly suppressed along with the graininess by the process of grain suppression, will usually suffice even if its degree is only slight.

Thus, the final processed image $I_1(x,y)$ which has been suppressed in noise such as graininess and which yet has been fully enhanced in sharpness can be obtained from the original image $I_0(x,y)$. If desired, the edge enhancing component $E_1(x,y)$ may be determined in a step earlier than the step of edge enhancement under consideration or, alternatively, the grain suppressed image $I_{10}(x,y)$ is not calculated by the above-described procedure of suppressing and removing graininess but in the step under consideration, grain suppression and edge enhancement may be performed simultaneously using the grain suppressing component $G_1(x,y)$ determined in the step of subdividing mottles and the edge enhancing component $E_1(x,y)$ determined either previously or in the step of edge enhancement. In these alternative cases, the operation may be expressed by the following equation (40) in view of equations. (37) and (39):

$$I_1(x,y)=I_S(x,y)-\alpha G_1(x,y)+\beta E_1(x,y) \quad (40)$$

Described above are the basic compositional features of an image processing method and apparatus according to the first embodiment of the present invention.

We now describe an image processing method and apparatus according to the second embodiment of the invention.

Figure 5:
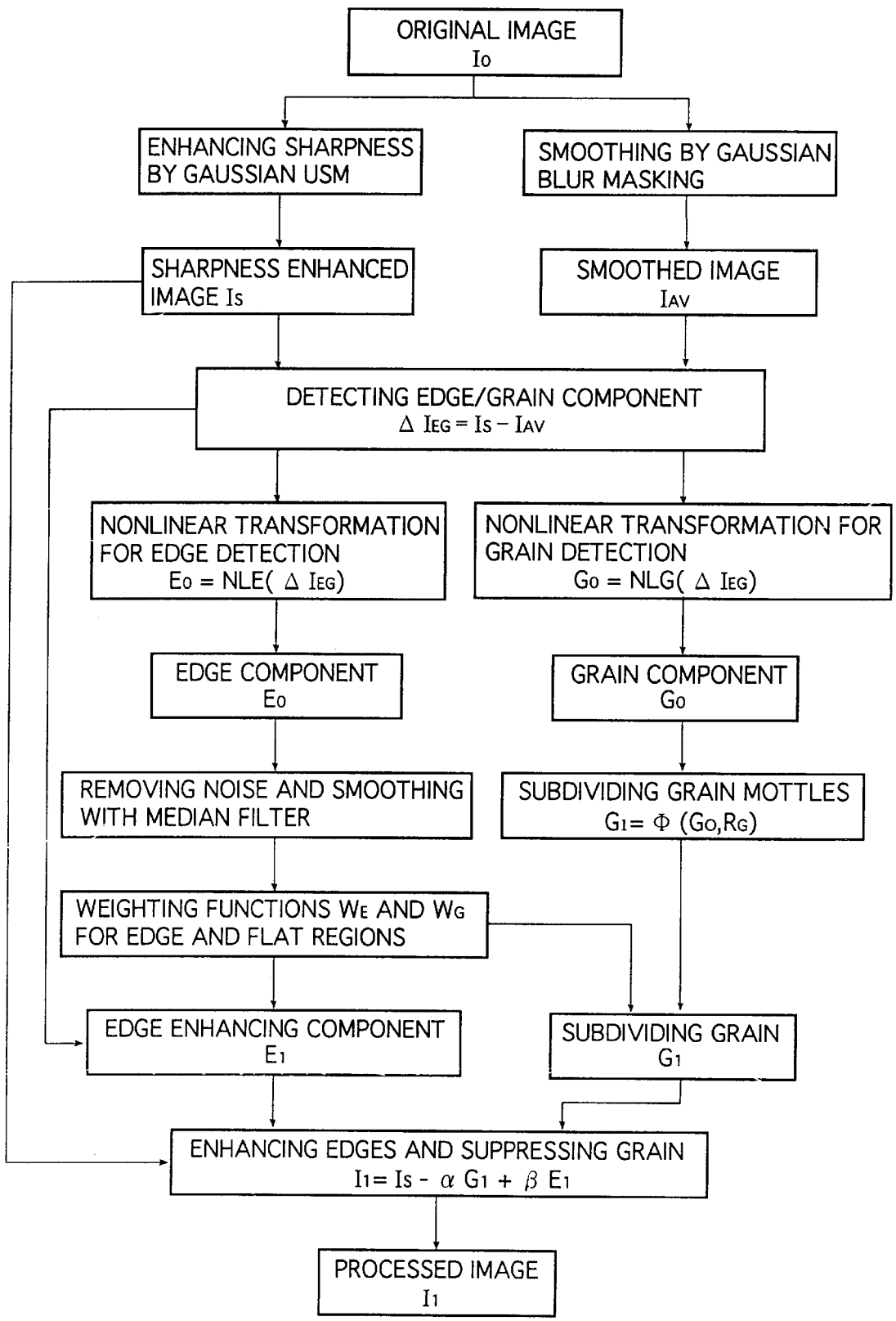
FIG. 5 is a flowchart for another embodiment of the method of the invention for processing digital images to suppress their noise and enhance their sharpness.

FIG. 5 is a flowchart for a processing algorithm according to the second embodiment of the invention. FIG. 10 is a block diagram of an exemplary image processing apparatus for implementing the image processing method according to the second embodiment of the invention. In the following description, graininess is considered as a typical example of the noise in a digital image.

It should first be mentioned that the second embodiment of the invention for processing images as outlined in FIG. 5 is identical to the first embodiment outlined in FIG. 1 except for the specific procedures and order of the edge detection for determining weighting data and the weighting with the determined weighting data. Therefore, detailed description will not be given to the identical parts of the two embodiments and only the differing parts will mainly be discussed below.

First, for each pixel, a sharpness enhanced image $I_S$ and a smoothed image $I_{AV}$ are generated from the original image $I_0$ and a component in which both edges and grain (noise) exist is extracted; in other words, edge/grain containing fine image data $\Delta I_{EG}$ are generated. The operation up to this stage is completely identical to the case of the first embodiment.

Subsequently, as FIG. 5 shows, the edges and grain are separated from the edge/grain image data $\Delta I_{EG}$ by nonlinear transformations NLE and NLG, respectively, to yield an edge component $E_0$ and a grain component $G_0$. The grain component $G_0$ is refined by the process of mottle subdividing to generate a subdivided grain component, namely, a grain suppressing component $G_1$. From the edge component $E_0$, weighting functions (data) for the edge and flat regions, $W_E$ and $W_G$, are determined.

Finally, the edge region of the image is subjected to sharpness enhancement using the weighting data for the edge region, $W_E$ whereas the flat region is subjected to grain suppression using the weighting data for the flat region, $W_G$. Thus, the edge/grain component $\Delta I_{EG}$ is multiplied (weighted) by $W_E$ to generate an edge enhanced component $E_1$ for the edge region. The subsequent procedures are completely identical to the case of the first embodiment; the grain suppressed component $G_1$ is multiplied by a specified factor, say, $\alpha$ and subtracted from the previously determined sharpness enhanced image $I_S$ and, at the same time, the edge enhanced component $E_1$ as multiplied by another factor, say, $\beta$ is added to $I_S$, thereby yielding a processed image $I_1$ which is sharpness enhanced in the edge region and grain suppressed in the flat region.

The individual steps in the image processing method according to the second embodiment of the invention and the individual components of the image processing apparatus 40 for performing those individual steps will be described below briefly with reference to FIGS. 5 and 10, respectively.

1) Sharpness enhancing step by sharpness enhancing means 12
2) Smoothing step by smoothing means 14 and the step of extracting edge/grain component by extracting means 16

These steps are the same as in the first embodiment and will not be described in detail. Essentially, a sharpness enhanced image $I_S$ and an edge/grain containing fine image data $\Delta I_{EG}$ are generated from the original image $I_0$.

3) Step of discriminating and separating edges and grain by separating means 42

The edges and grain are separated from the edge/grain containing fine image data $\Delta I_{EG}$ by nonlinear transformation functions, NLE and NLG. An edge component $E_0$ and a grain component $G_0$ can be determined by the following equations (41) and (42), respectively:

$$G_0 = NLG(\Delta I_{EG}) \tag{41}$$

$$E_0 = NLE(\Delta I_{EG}) \tag{42}$$

4) Step of calculating weighting coefficients for the edge and grainy regions by weighting data computing means 44

Weighting functions (data) for the edge and flat regions, $W_E$ and $W_G$, are determined from the edge component $E_0$ for the object in the original image $I_0$ as detected in step 3).

5) Step of subdividing grain mottles by subdividing means

This step is also the same as in the first embodiment and a grain suppressed component $G_1$ is generated by equation (4).

The image processing method according to the second embodiment of the invention which is shown in FIG. 5 can be implemented with the image processing apparatus of the invention which is indicated by 40 in FIG. 10. AS shown, the apparatus 40 comprises sharpness enhancing means 12, smoothing means 14, edge/noise component ($\Delta I_{EG}$) extracting means 16, separating means 42, weighting data computing means 44, subdividing means 22, edge enhancement weighting means 24 and processed image data computing means 26. Except for the separating means 42 and the weighting data computing means 44, the image processing apparatus 40 shown in FIG. 10 is identical to the image processing apparatus 10 shown in FIG. 9 and the identical components will not be described again in detail. It suffices here to say that the separating means 42 in the image processing apparatus 40 determines not only the noise component $G_0$ but also the edge component $E_0$ by nonlinear transformation. The weighting data computing means 44 in the image processing apparatus 40 comprises noise removing means 46 and computing means 30; the edge component $E_0$ supplied from the separating means 42 is freed of noise by the noise removing means 46 using a median filter or the like and, thereafter, the noise-free edge component is fed into the computing means 30 to calculate weighting data $W_E$ and $W_G$ for the edge and noise (flat) regions.

6) Step of suppressing graininess and enhancing edges (sharpness), or step of calculating final processed image, by edge enhancement weighting means 24 and processed image data computing means 26

The edge region of the image is subjected to sharpness enhancement using the weighting data for the edge region, $W_E$ whereas the flat region is subjected to graininess suppression using the weighting data for the flat region, $W_G$. Thus, an edge enhancing component $E_1$ is generated from the edge/grain containing fine image data $\Delta I_{EG}$ using $W_E$; subsequently, as in the first embodiment, the previously determined sharpness enhanced image $I_S$ and the grain suppressing component $G_1$ and the presently determined edge enhancing component $E_1$ are operated upon by equation (5) to yield a processed image $I_1$ which is sharpness enhanced in the edge region of the original image $I_0$ and grain suppressed in the flat region such as the grain region.

We now describe in detail the respective steps in the image processing method according to the second embodiment of the invention. Since the first three steps, 1) sharpness enhancement by sharpness enhancing means 12, 2) smoothing by smoothing means 14 and 3) extracting the grain/edge component by extracting means 16, are completely identical to the case of the first embodiment, the following description is directed to steps 4)–6) and final step 7).

4) To discriminate and separate the grainy and edge components by separating means 42, the characteristics of the grain and edges are utilized. In a spatial domain, the grain occurs in the entire part of the film or the image and it is more conspicuous in the flat area of the object than along its contour and edges. On the other hand, the edges of the image mainly occur along the contour of the object and in a fine structure on its surface. In a density domain, the grain is mainly composed of the grain of the photographic material used in taking the original image, so it has in most cases a small density difference as indicated by a dashed line in FIG. 3 which depicts a characteristic frequency distribution of a density difference component for the grainy and edge regions of the image. On the other hand, the edges of the picture depend on the contrast of the object and, as indicated by a solid line in FIG. 3, their density difference varies greatly with the image and range from a very small difference to a significantly great one. The step of discriminating and separating grain and edges consists of two sub-steps, one for discriminating and detecting the grain and the other for discriminating and detecting the edges.

(1) Discriminating and detecting the grain

As in the process of separating image information about graininess from image information concerning the edges in step 6) of discriminating and separating grain and edges in the first embodiment, the grain is discriminated and detected by making use of the characteristics in the density region. As shown in FIG. 3, a signal with a small density difference is mainly composed of a grainy component and a small portion of an edge signal whereas a signal of a great density difference is mainly composed of an edge component and a small portion of a grainy component with a comparatively large density difference; hence, the relative magnitude of density difference can be used to effect grain and edge separation. As in the first embodiment, detection of the grainy component $G(x,y)$ is performed using a LUT for nonlinear transformation (see FIG. 4) which is expressed by equation (25).

If the nonlinear transformation LUT is written as a nonlinear transformation function NLG and the edge/grain component as $\Delta I_{EG}(x,y)$, then the grainy component $G_0(x,y)$ can be expressed as follows in view of equation (25):

$$G_0(x,y)=NLG(\Delta I_{EG}(x,y)) \quad (43)$$

This is how the grainy component $G_0(x,y)$ is determined.

(2) Discriminating and detecting the edges

As in the above-described discrimination and detection of the grain, the edges are discriminated and detected from the edge/grain containing image data $\Delta I_{EG}(x,y)$ expressed by equation (18) by utilizing the characteristics in the density domain. Edge detection is performed on the assumption that a signal having a greater density difference than a threshold is chiefly composed of the edge component as shown in FIG. 3 although it also contains a small amount of a grainy component with a comparatively large density difference. Detection of the edge component $E(x,y)$ is performed using a LUT for nonlinear transformation (see FIG. 6) as expressed by the following equation (44):

$$E(x,y)=LUT\{\Delta D(x,y)\} \quad (44)$$

where LUT is given by:

$$LUT(\Delta D)=\Delta D\{1-\exp[-(\Delta D)^2/a_E^2]\} \quad (45)$$

where $a_E^2$ is a constant determined from a threshold $E_T$ for edge detection and expressed by:

$$a_E^2=-E_T^2/\log_e(\tfrac{1}{2}) \quad (46)$$

The threshold $E_T$ takes an appropriate value dependent on the magnitude of the graininess of the image to be processed and which is preferably proportional to the threshold for discriminating graininess, $G_T$, as expressed by the following equation (47):

$$E_T=k_E G_T \quad (47)$$

where $k_E$ is a proportionality constant which is preferably between 1.0 and 3.0. As the value of $E_T$ becomes closer to $G_T$, the contrast of the edges that can be detected becomes finer but, at the same time, there increases the probability that grainy variations are erroneously interpreted as representing the edges. Conversely, if the value of $E_T$ becomes greater than $G_T$, there is no chance of such misinterpretation, nor is the possibility of unwanted entrance of grain information but, on the other hand, edge information of a very small contrast can no longer be effectively captured.

The threshold $E_T$ is such that grain/edge density variations $\Delta I_{EG}(x,y)$ above this value are regarded to represent edges. As will be readily understood from equation (45) and FIG. 6, the grain and edge separation is not as sharp as is effected by turning a switch on and off at that threshold but the edges to be detected decreases in accordance with a LUT profile that gradually decreases in value with the decreasing density variation. Therefore, the grain is detected along with the edges but in a gradually decreasing proportion; as a consequence, unnatural artifacts are less likely to occur than in the method which effects edge/grain separation in an on-off fashion.

It should be remembered that if edge detection is solely dependent on the density variation, a small amount of density variations due to graininess are also detected to potentially yield non-smooth edge-related image data $E(x,y)$. Hence, in order to ensure that the entrance of graininess is sufficiently minimized to produce smooth edges, a median filter is preferably employed when removing the graininess by noise removing means 46 in the computing means 44. A median filter is such that the image data for a local region, say, n×n pixels surrounding the pixel to be processed are referenced to replace the value of that pixel by the median of said n×n pixels. The edge-related image data $E(x,y)$ are processed with a n×n median filter to yield $E_M(x,y)$. To produce smooth edges, a median filter is used to perform the smoothing process in the case under consideration; however, this is not the sole case of the invention and any other smoothing techniques may be employed as long as they can smooth the edge component $E(x,y)$ to the required extent.

5) We next describe the step of calculating the weighting coefficients (data) for the edge and grainy regions using the weighting data computing means 44.

The weighting data for the edge region, $W_E$, which determines the degree of weighting of the edge region and the weighting data for the flat region, $W_G$, which determines the degree of weighting of the grainy region are generated using the edge-related image data $E_M(x,y)$ detected from the image in the earlier edge detecting step, as well as the threshold for edge detection, $E_T$, and the threshold for differentiating graininess, $G_T$. If the weighting data for the edge region is written as $W_E(x,y)$, then it is expressed by:

$$W_E(x,y)=|E_M(x,y)|/[c_1 E_T+|E_M(x,y)|] \quad (48)$$

where $c_1$ is a constant for adjusting the level of weighting and preferably between 0.2 and 2.0. Equation (48) produces a value of $W_E(x,y)$ which is close to 1.0 if the absolute magnitude of the edge-related image, $|E_M(x,y)|$ is great whereas it produces a value smaller than 1.0 in the opposite case.

If the weighting data for the grains region is written as $W_G(x,y)$, then it is expressed by:

$$W_G(x,y)=c_2 G_T/[c_2 G_T+|E_M(x,y)|] \quad (49)$$

where $c_2$ is a constant for adjusting the level of weighting and preferably between 0.2 and 2.0. Equation (49) produces a value of $W_G(x,y)$ which is close to 1.0 if the absolute magnitude of the edge-related image, $|E_M(x,y)|$ is small whereas it produces a value smaller than 1.0 in the opposite case.

6) The step of subdividing grainy mottles by subdividing means 22 is in itself identical to step 7) of subdividing grainy mottles in the first embodiment and will not be described here, except that in the second embodiment, the subdivided grainy component $G_1(x,y)$ as determined by equation (32) may be weighted by the weighting function for the grainy region, $W_G(x,y)$, to produce a grain suppressing component.

According to equation (33), the subdivided grainy component $G_1(x,y)$ obtained in step 6) is immediately used as a grain suppressing component. Alternatively, as represented by the following equation (33a), $G_1(x,y)$ may be multiplied by the weighting function for the grainy region, $W_G(x,y)$, as determined in the preceding step and the thus weighted subdivided grainy component $G_2(x,y)$ is used as the grain suppressing component. In this case, $G_2(x,y)$ is subtracted from the picture to be suppressed in graininess, $I_S(x,y)$, in accordance with the following equation (33b), whereby the grain of the image is effectively suppressed:

$$G_2(x,y) = W_G(x,y) \times G_1(x,y) \quad (33a)$$

$$I_{10}(x,y) = I_S(x,y) - \alpha G_2(x,y) \quad (33b)$$

7) Suppressing and removing graininess in the final step of graininess suppression and edge enhancement by processed image data calculating means 26
8) Enhancing edges in the final step by edge enhancement weighting means 24

The two processes are in themselves identical to the process 8) of suppressing and removing grain in the final step of grain suppression and edge enhancement and the process 9) of enhancing edges in the first embodiment and, hence, need not be described in detail. It suffices here to say that if the subdivided grain component $G_1(x,y)$ as determined by equation (32) is replaced by the weighted subdivided grain component $G_2(x,y)$ in step 6) of subdividing grainy mottles, equations (37) and (40) may be substituted by the following equations (37a) and (40a), respectively, in the steps 7) and 8):

$$I_{10}(x,y) = I_S(x,y) - \alpha G_2(x,y) \quad (37a)$$

$$I_1(x,y) = I_S(x,y) - \alpha G_2(x,y) + \beta E_1(x,y) \quad (40a)$$

Described above are the basic compositional features of the image processing method and apparatus according to the second embodiment of the present invention.

While the method and apparatus of the invention for processing digital images to suppress their noise and enhance their sharpness have been described above in detail with reference to two specific embodiments, the invention is by no means limited thereto and various improvements and design modifications can of course be made without departing from the scope and spirit of the invention.

According to the invention, the original image is subjected to sharpness enhancement to produce a sharpness enhanced image; the sharpness enhanced grainy component of this image is discriminated and subjected to random modulation or a modulation by a fine regular pattern to produce a refined grainy component, which is subtracted from the sharpness enhanced image to suppress its grain; the grain finally obtained has a natural visual impression that is spatially finer and characterized by smaller density changes than it initially was. Since the grain of the original image is sharpness enhanced and refined spatially in the present invention, the grain ultimately obtained is as fine as can be produced when using fine-grain emulsions in silver halide photographic materials and a natural grain suppressing effect is achieved without causing any visual oddities or unpleasing sensation such as "blurry graininess" which is caused in the prior art using a smoothing technique.

If the method of the invention is applied to silver halide color photographic materials, an improvement is achieved in both grain suppression and sharpness enhancement without causing any artificiality and oddities due to "blurry graininess" which have been unavoidable from the prior art process of suppressing graininess while enhancing sharpness and this marked improvement offers a substantial benefit to the industry.

The method and apparatus of the invention for processing digital images to suppress noise and enhance sharpness will now be described with reference to the following specific examples.

EXAMPLE 1

A photographic image recorded on a 35-mm color negative film FUJICOLOR SUPER G ACE 400 (product of Fuji Photo Film Co., Ltd.) was read with a scanner SCANNER & IMAGE PROCESSOR SP-1000 (product of Fuji Photo Film Co., Ltd.; pixel number, 2760×1840) and converted into a digital image of 8 bits for each of R, G and B colors. This original image was processed by the first embodiment of the invention method using the apparatus 10 shown in FIG. 9 according to the flowchart shown in FIG. 1.

The process of sharpness enhancement was performed by Gaussian unsharp masking according to equation (9) using the following 3×3 unsharp mask:

$$\begin{matrix} -0.50 & -0.82 & -0.50 \\ -0.82 & 6.27 & -0.82 \\ -0.50 & -0.82 & -0.50 \end{matrix}$$

The smoothing process consisted of multiplication by a normal distribution function to effect averaging. The processing mask was one of 9×9 pixels expressed by equation (17) which was used in such a way that the sum of the values of all pixels would be 1.0. The result was the same as would be attained by processing with a low-pass filter.

For edge detection, an array of 3×3 pixels as shown in FIG. 2 was used and a local variance method was performed in accordance with equation (20). For determining the edge region weighting coefficient $W_E(x,y)$, nonlinear transformation was performed in accordance with equation (22), in which the value of $\sigma_T$, or the threshold of local variance for edges, was set at 30.

Figure 4:
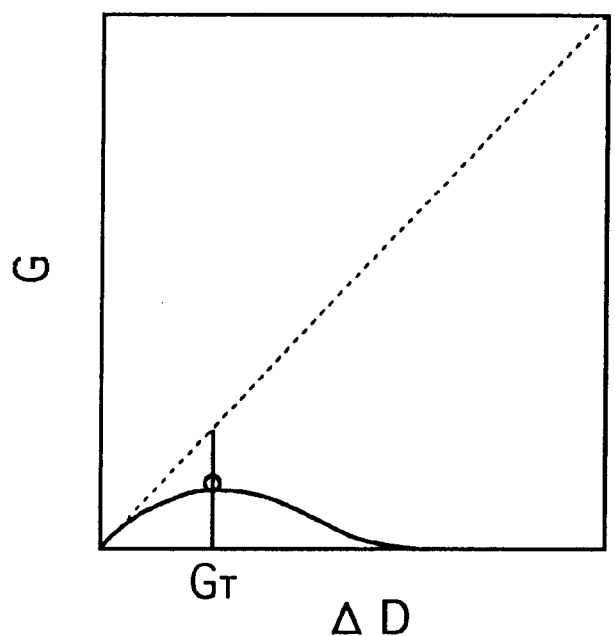
FIG. 4 is an illustration of a look-up table (LUT) function which is to be used in separating the grainy component in the image processing method of the invention.

In the process of differentiating and separating grain and edges, a nonlinear transformation LUT as shown in FIG. 4 was used, with the value of $G_T$, or the threshold of grain discrimination, being set at 50 (about 100 times a density value in 0–255 gradation steps for 8 bits). Gaussian random numbers were used in the process of subdividing grainy mottles. The values of parameters $\alpha$ and $\beta$ in equation (40) for yielding the final processed image were set at 0.7 and 0.3, respectively.

Figure 7A:
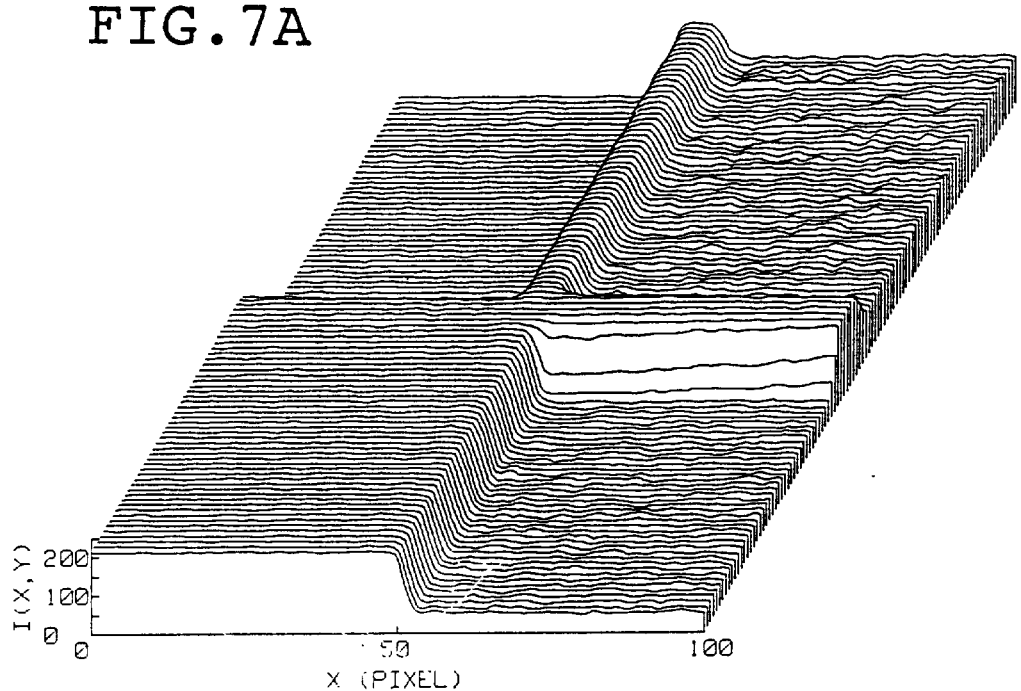
FIG. 7A shows a three-dimensional density profile of the original image of a scene obtained in the first embodiment of the invention.
Figure 7B:
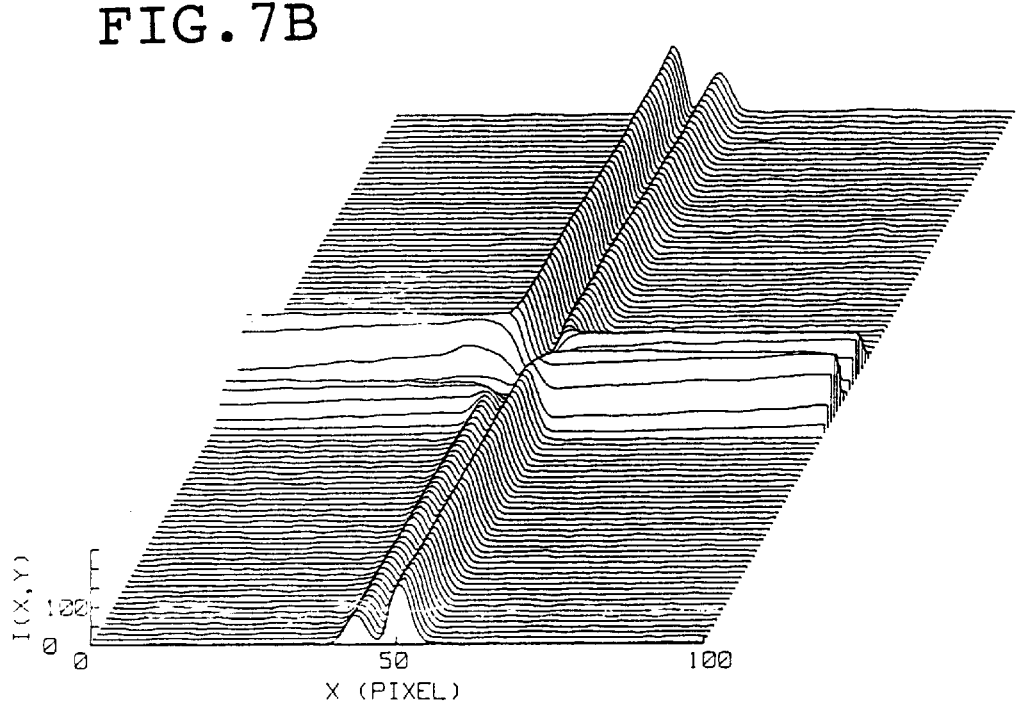
FIG. 7B shows a three-dimensional density profile of an image after detection of the edge component.

Three-dimensional image density profiles as obtained by application of an image processing method according to the first embodiment of the invention are shown for a single scene in FIGS. 7A–7J ranging from the original image $I_0$ to the final processed image $I_1$. FIG. 7A refers to the original image $I_0$, FIG. 7B an image detecting an edge component of the object $E_0$, FIG. 7C a sharpness enhanced image $I_S$, FIG. 7D a smoothed image $I_{AV}$, FIG. 7E a grain/edge component $\Delta I_{EG}$, FIG. 7F grainy region weighting data $W_G$, FIG. 7G a grainy component $G_0$ separated from the grain/edge component, FIG. 7H a subdivided grainy component $G_1$, FIG. 7I edge region weighting data $W_E$, and FIG. 7J the final processed image $I_1$.

Figure 7C:
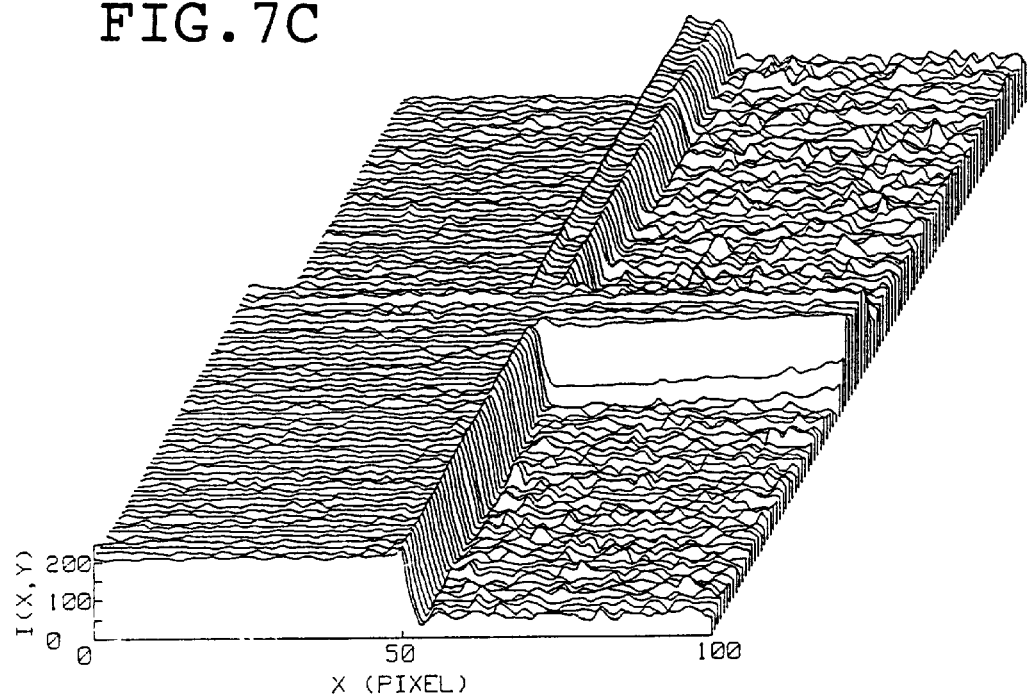
FIG. 7C shows a three-dimensional density profile of an image after sharpness enhancement.
Figure 7D:
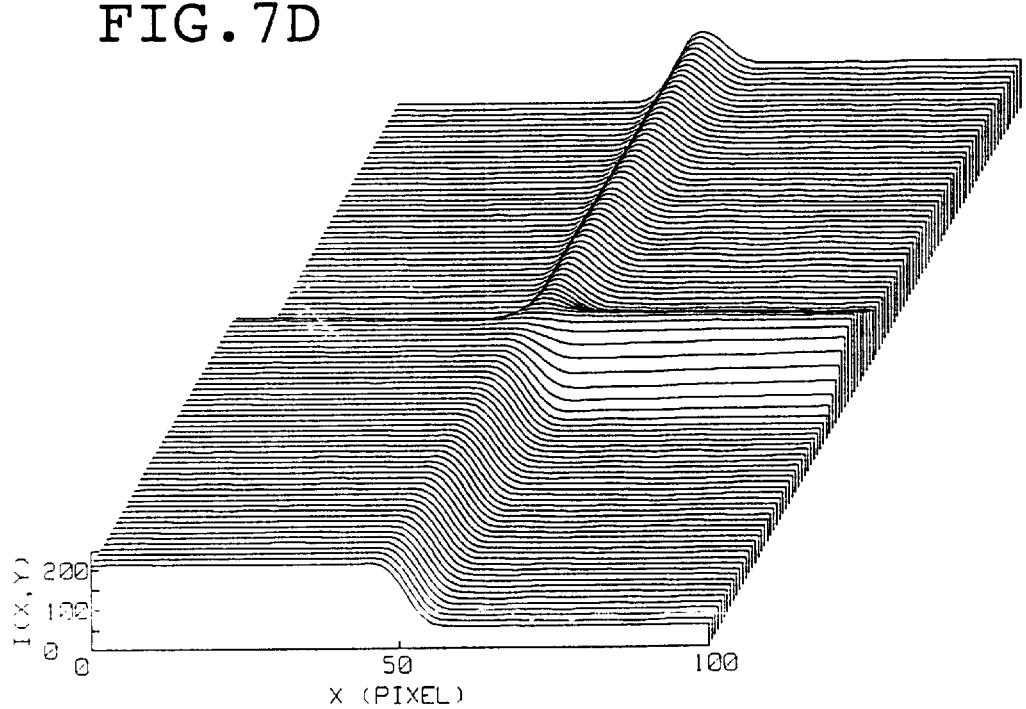
FIG. 7D shows a three-dimensional density profile of a smoothed image.
Figure 7E:
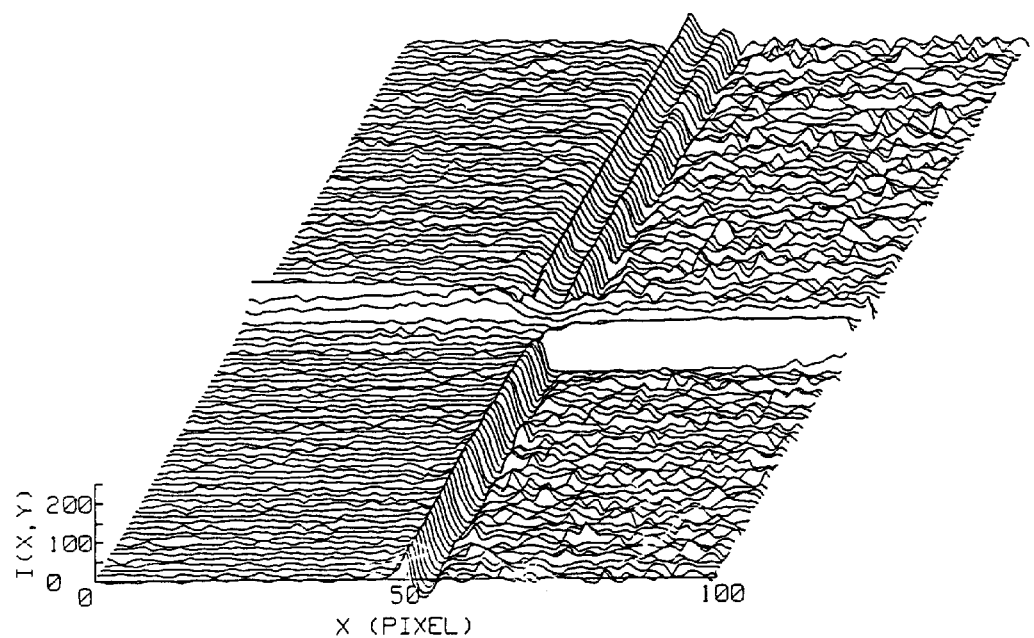
FIG. 7E shows a three-dimensional density profile of a component where both grain and edges exist.
Figure 7F:
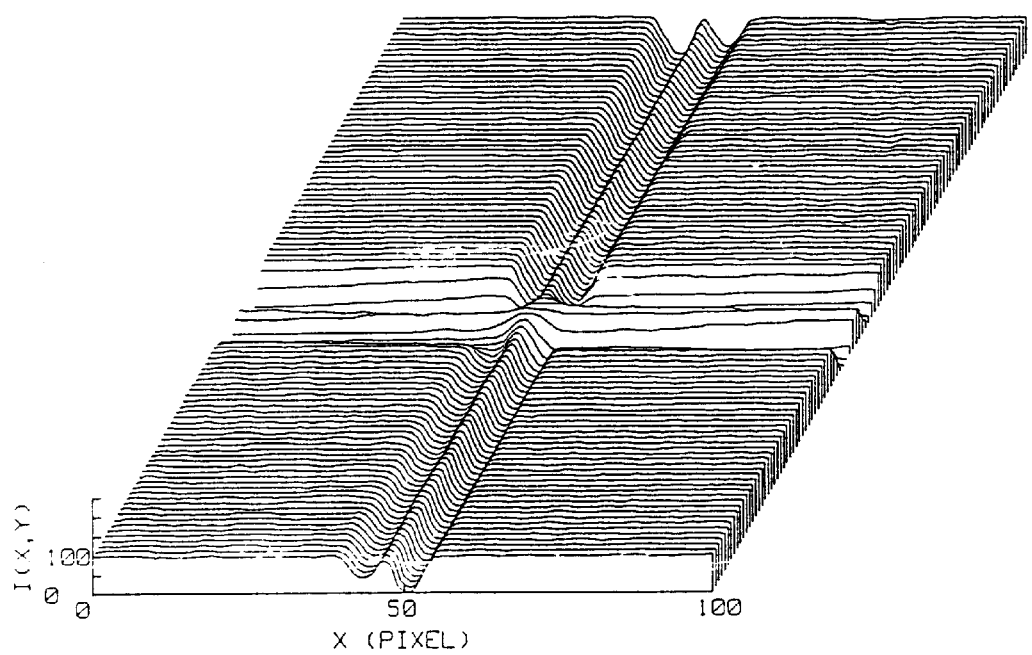
FIG. 7F shows a three-dimensional density profile of weighting data for the grainy region.
Figure 7G:
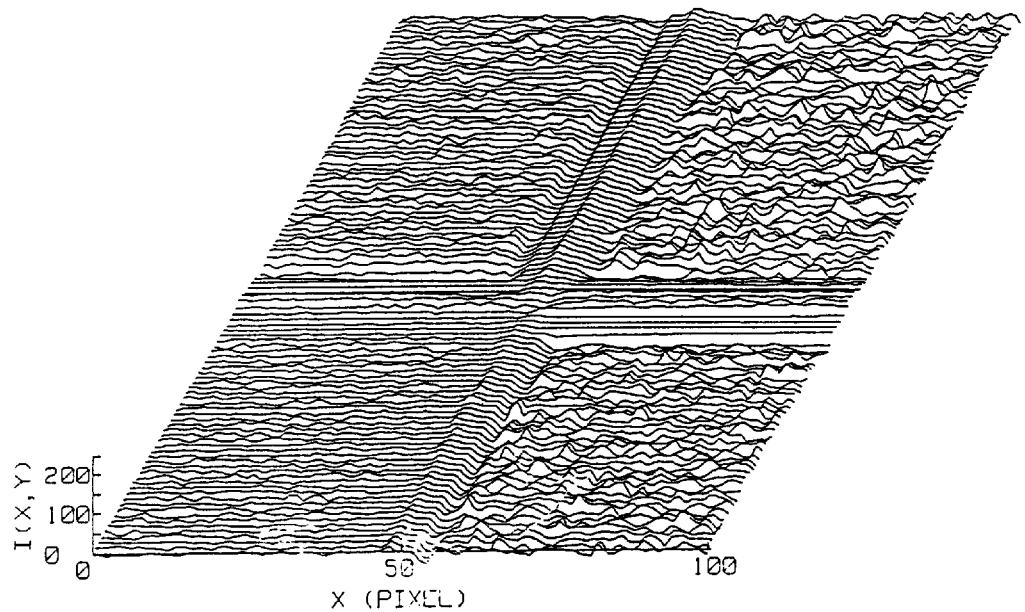
FIG. 7G shows a three-dimensional density profile of a grainy component.
Figure 7H:
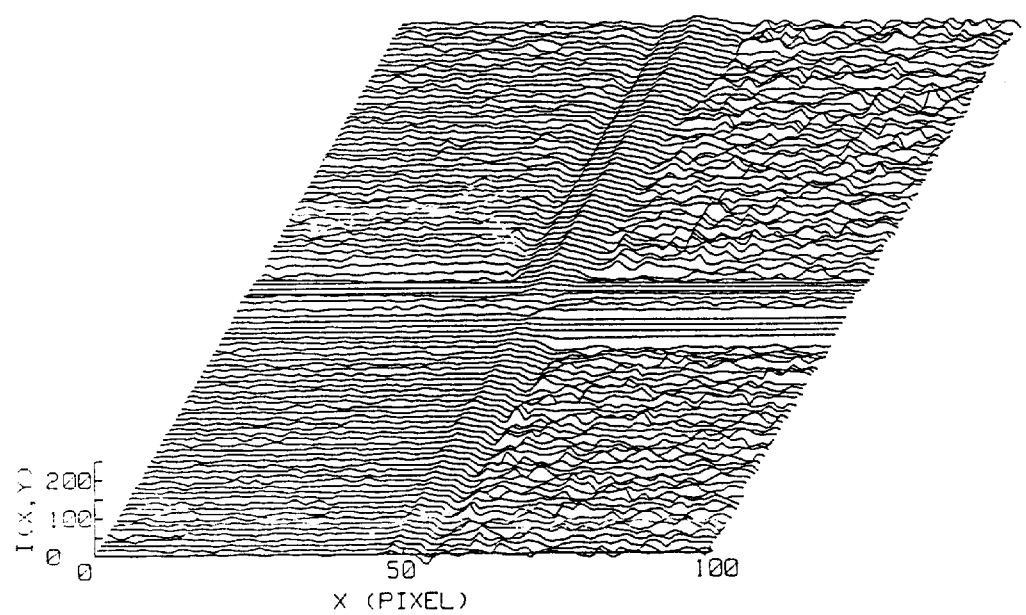
FIG. 7H shows a three-dimensional density profile of a subdivided grainy component.
Figure 7I:
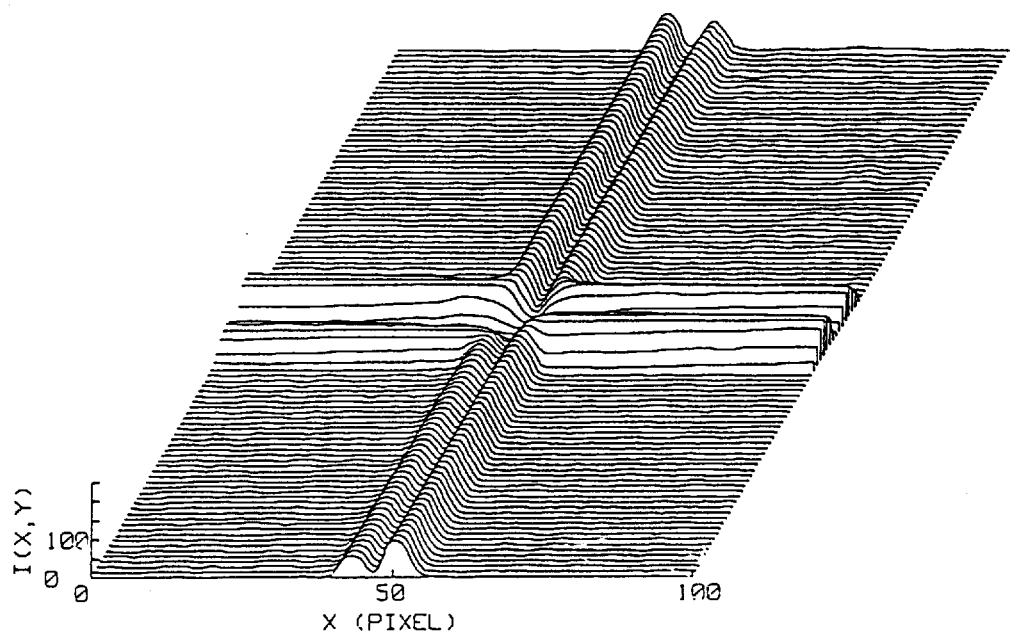
FIG. 7I shows a three-dimensional density profile of weighting data for the edge region.
Figure 7J:
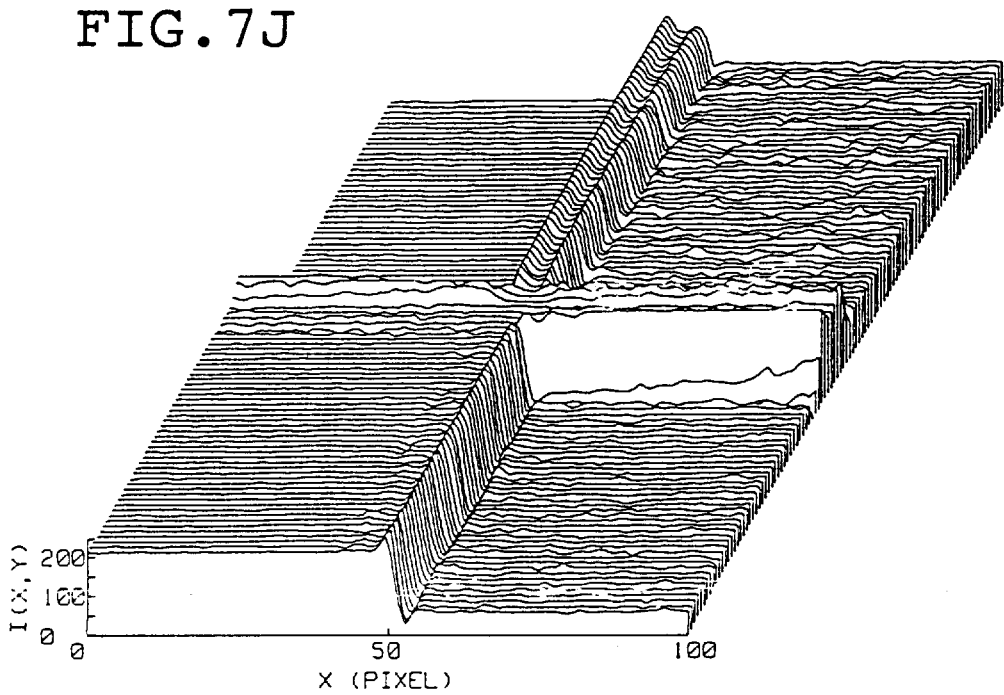
FIG. 7J shows a three-dimensional density profile of the final processed image.

Obviously, the final processed image $I_1$ shown in FIG. 7J has the edge portion enhanced almost as sharp as the sharpness enhanced image $I_S$ shown in FIG. 7C compared to the original image $I_0$ shown in FIG. 7A; on the other hand, the grain of $I_1$ is by far better than that of $I_S$ and has been suppressed to almost the same level as the original $I_0$. Thus, it is clear that the image processing method of the invention produces a high-quality image that has only the edge portion enhanced in sharpness while selectively suppressing the graininess.

When the image processing method of the invention was applied to photographic images recorded on common silver halide color photographic materials including color and black-and-white films [in 35-mm, APS (advanced photo system), LF panoramic and instant photography], both graininess and sharpness were improved to produce readily appreciable effects.

In particular, the improvement in graininess was comparable to the result achieved by refining the emulsion grains in photographic materials and there was not any visual unnaturalness or oddities due to "blurry grain" which were unavoidable defects of the various prior art methods of removing graininess based on an averaging process or the reduction of fluctuations. As for image sharpness, the combination with the above-described process of grain suppression was effective in producing a significantly greater enhancing effect than the conventional unsharp masking and Laplacian filter.

EXAMPLE 2

As in Example 1, a photographic image recorded on a 35-mm color negative film FUJICOLOR SUPER G ACE 400 (product of Fuji Photo Film Co., Ltd.) was read with a scanner SCANNER & IMAGE PROCESSOR SP-1000 (product of Fuji Photo Film Co., Ltd.; pixel number, 2760× 1840) and converted to a digital image of 8 bits for each of R, G and B colors. This original image was processed by the second embodiment of the invention method using the apparatus 40 shown in FIG. 10 according to the flowchart shown in FIG. 5.

The processes of sharpness enhancement and smoothing were completely the same as in Example 1.

Figure 6:
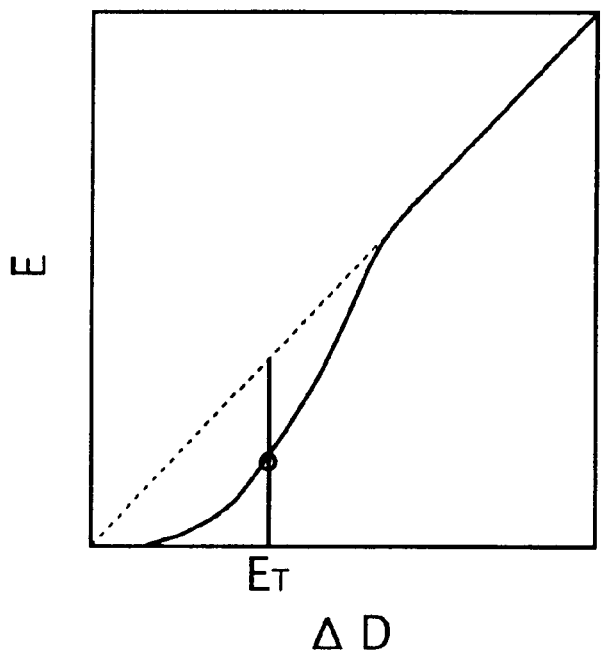
FIG. 6 is an illustration of a look-up table (LUT) function which is to be used in detecting the edge component in the image processing method of the invention.

In the process of discriminating and separating grain and edges, a grainy component was detected using a nonlinear transformation LUT as shown in FIG. 4, with the value of $G_T$, or the threshold of grain discrimination, being set at 50 (about 100 times a density value in 0–255 gradation steps of 8 bits), and an edge component was detected using a nonlinear transformation LUT as shown in FIG. 6, with the value of $E_T$, or the threshold of edge detection, being set at 50 (about 100 times a density value in 0–255 gradation steps for 8 bits). The edge component E(x, y) was smoothed to provide a smoothed edge-related image $E_M(x,y)$ using a median filter having a mask size of 3×3 pixels. In the process of computing the weighting data for the edge and flat regions, $G_T$ and $E_T$ were also used as the thresholds for grain discrimination and edge detection, respectively, and they were of the same values as those employed in the process of discriminating and separating graininess and edges. In the process of subdividing grainy mottles, Gaussian random numbers were used as in Example 1. The values of parameters α and β in equation (40) for yielding the final processed image were set at 0.8 and 0.3, respectively.

Figure 8A:
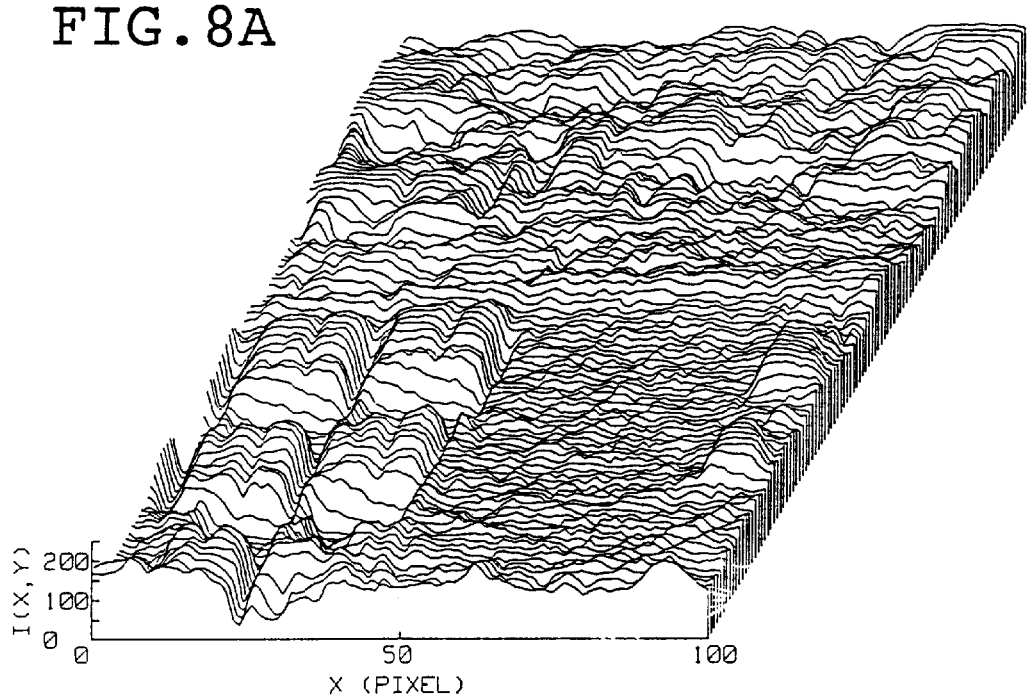
FIG. 8A shows a three-dimensional density profile of the original image of a scene obtained in the second embodiment of the invention.
Figure 8B:
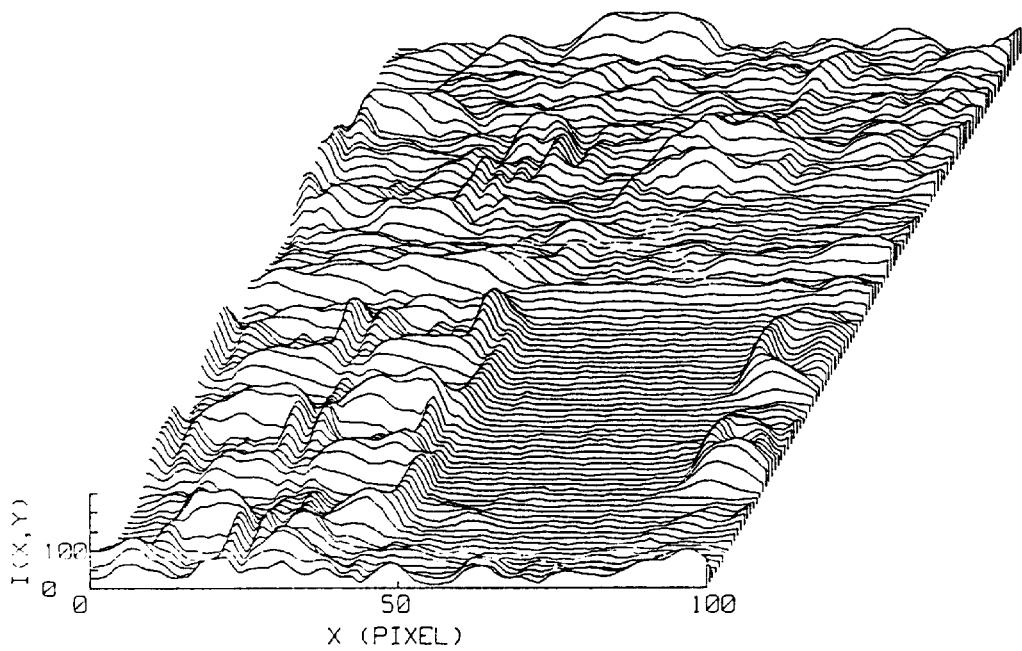
FIG. 8B shows a three-dimensional density profile of an image after edge detection.
Figure 8C:
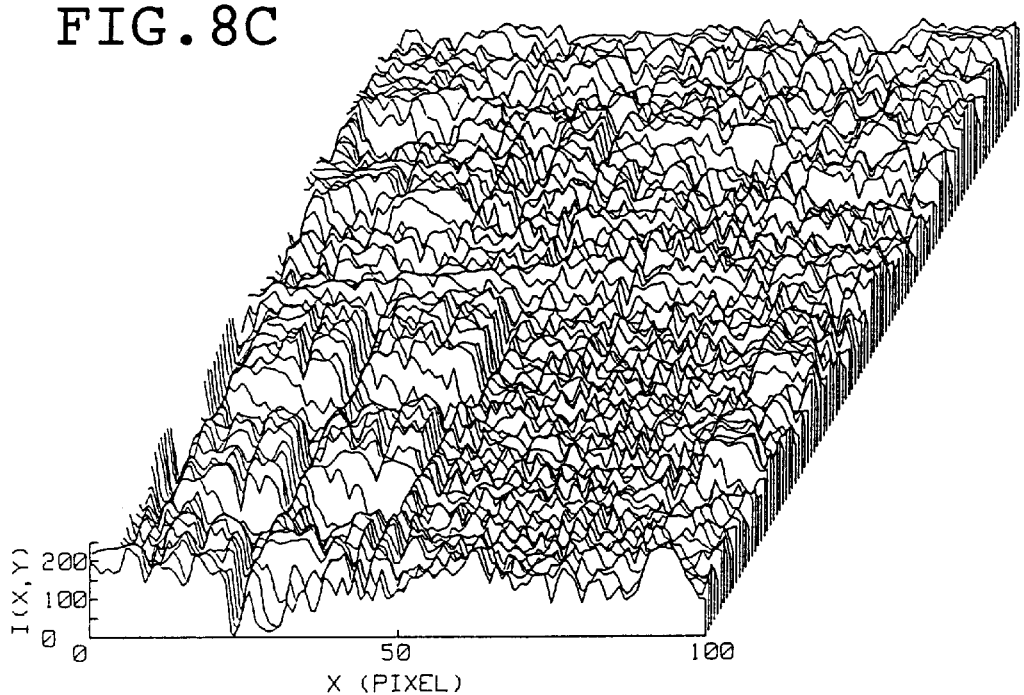
FIG. 8C shows a three-dimensional density profile of an image after sharpness enhancement.
Figure 8D:
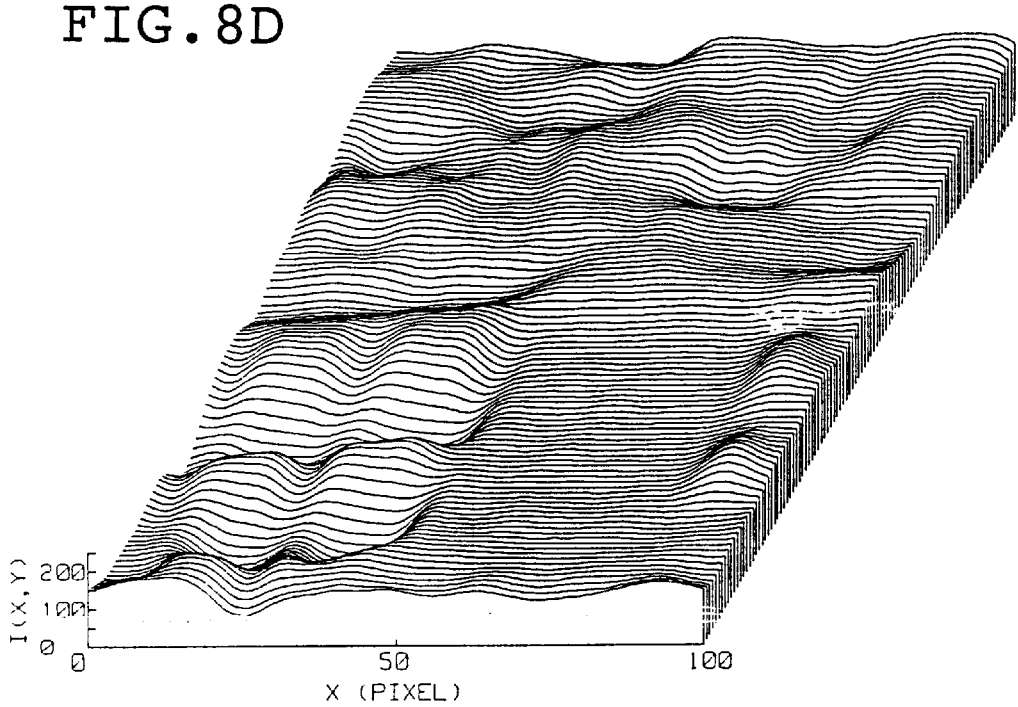
FIG. 8D shows a three-dimensional density profile of a smoothed image.
Figure 8E:
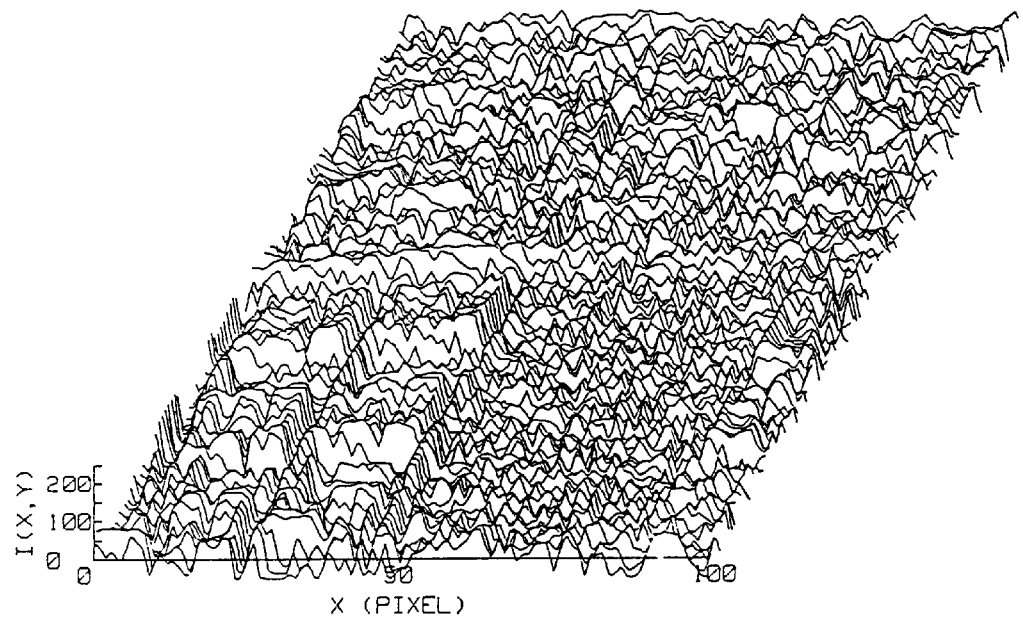
FIG. 8E shows a three-dimensional density profile of an image component where both grain and edges exist.
Figure 8F:
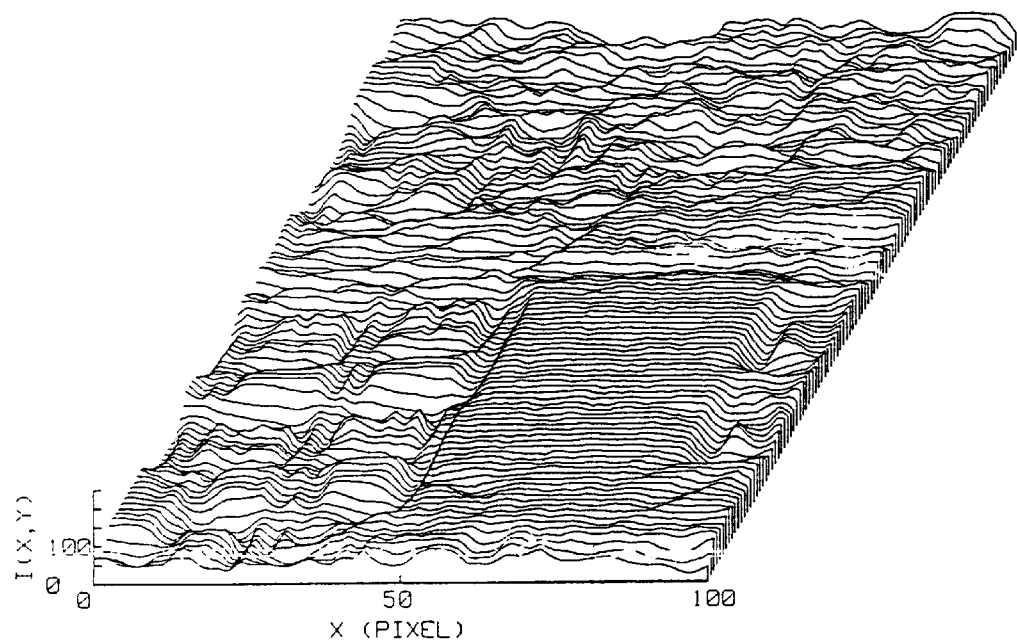
FIG. 8F shows a three-dimensional density profile of weighting data for the grainy region.
Figure 8G:
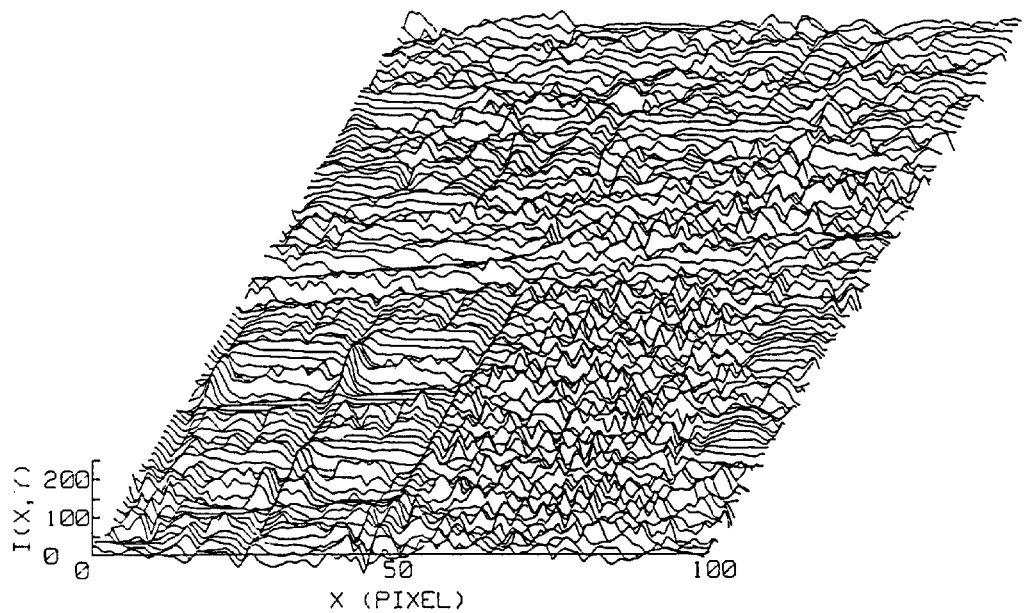
FIG. 8G shows a three-dimensional density profile of a grainy component.
Figure 8H:
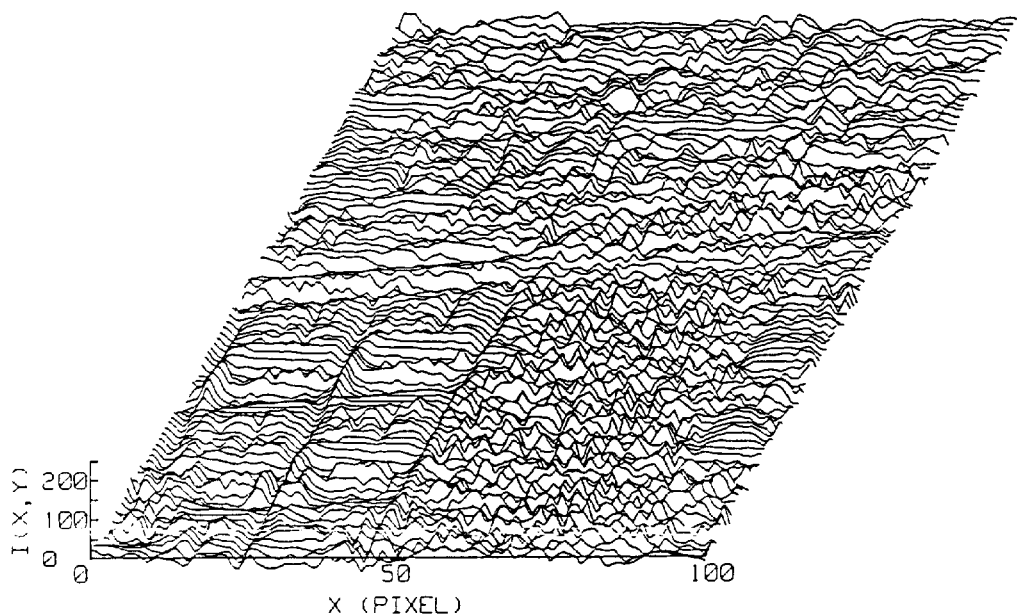
FIG. 8H shows a three-dimensional density profile of a subdivided grainy component.
Figure 8I:
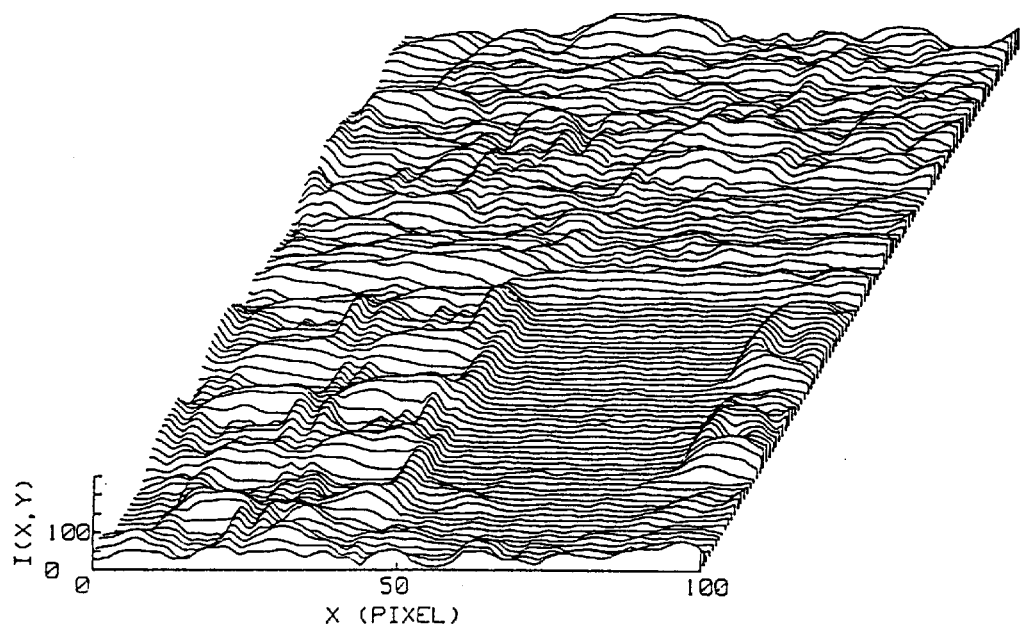
FIG. 8I shows a three-dimensional density profile of weighting data for the edge region.

Three-dimensional image density profiles as obtained by application of an image processing method according to the second embodiment of the invention are shown for a single scene in FIGS. 8A–8J ranging from the original image $I_0$ to the final processed image $I_1$. FIG. 8A refers to the original image $I_0$, FIG. 8B an image detecting an edge component of the object $E_0$, FIG. 8C a sharpness enhanced image $I_S$, FIG. 8D a smoothed image $I_{AV}$, FIG. 8E a grain/edge component $\Delta I_{EG}$, FIG. 8F grainy region weighting data $W_G$, FIG. 8G a grainy component $G_0$ separated from the grain/edge component, FIG. 8H a subdivided grainy component $G_1$. FIG. 8I edge region weighting data $W_E$, and FIG. 8J the final processed image $I_1$.

Figure 8J:
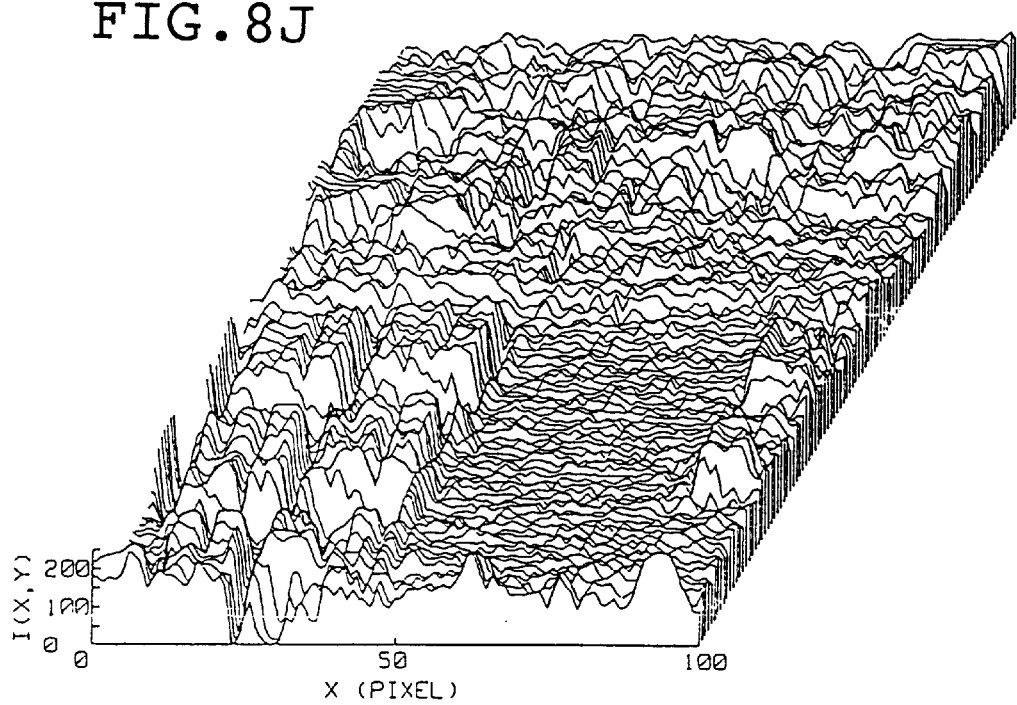
FIG. 8J shows a three-dimensional density profile of the final processed image.

Obviously, the final processed image $I_1$ shown in FIG. 8J has the edge portion enhanced almost as sharp as the sharpness enhanced image $I_S$ shown in FIG. 8C compared to the original image $I_0$ shown in FIG. 8A; on the other hand, the grain of $I_1$ is by far better than that of $I_S$ and has been suppressed to almost the same level as the original $I_0$. Thus, it is clear that the image processing method of the invention produces a high-quality image that has only the edge portion enhanced in sharpness while selectively suppressing the graininess.

When the image processing method of the invention was applied to photographic pictures recorded on common silver halide photographic materials including color and black-and-white films [in 35-mm, APS (advanced photo system), LF panoramic and instant photography], both graininess and sharpness were improved to produce readily appreciable effects.

In particular, the improvement in graininess was comparable to the result achieved by refining the emulsion grains in photographic materials and there was not any visual unnaturalness or oddities due to "blurry grain" which were unavoidable defects of the various prior art methods of removing graininess based on an averaging process or the reduction of fluctuations. As for image sharpness, the combination with the above-described process of grain suppression was effective in producing a significantly greater enhancing effect than the conventional unsharp masking and Laplacian filter.

What is claimed is:

1. A method of processing digital images to suppress their noise and enhance their sharpness, comprising the steps of:
    performing a sharpness enhancing process on original image data to generate sharpness enhanced image data;
    performing a smoothing process on said original image data to generate smoothed image data;
    subtracting the smoothed image data from said sharpness enhanced image data to extract a component consisting of both edges and noise;
    performing nonlinear transformation on said edge/noise containing component to separate a noise component and performing a subdividing process on the resulting noise component to produce a subdivided noise component;
    separately detecting an edge component from said original image data and determining weighting data for an edge region and a noise region from the detected edge component;
    weighting said edge/noise containing component with the weighting data for said edge region to produce an edge enhancing component; and
    subtracting said subdivided noise component multiplied by a factor from said sharpness enhanced image data while adding said edge enhanced component multiplied by another factor to said sharpness enhanced image data so as to generate processed image data.

2. The method according to claim 1, wherein the nonlinear transformation for separating said noise component is performed after said edge/noise containing component is weighted with the weighting data for said noise region.

3. The method according to claim 2, wherein said edge component for determining said weighting data for the edge and noise regions is directly detected from said original image data by a local variance method.

4. The method according to claim 1, wherein said edge component for determining said weighting data for the edge and noise regions is detected when said edge/noise containing component is directly processed by nonlinear transformation to separate said noise component.

5. The method according to claim 4, wherein said edge component separated from said edge/noise containing component is smoothed with a median filter for removing graininess before the weighting data for said edge and noise regions are determined.

6. The method according to claim 1, wherein said subdivided noise component multiplied by the factor is subtracted from said sharpness enhanced image data after it is weighted by the weighting data for said noise region.

7. The method according to claim 1, wherein the nonlinear transformation for separating said noise component is performed by a function which decreases exponentially in a continuous manner as the density variation of noise either increases or decreases from its threshold.

8. The method according to claim 1, wherein the nonlinear transformation for separating said noise component is performed by a function which decreases exponentially in a continuous manner as the density variation of noise increases from its threshold.

9. The method according to claim 1, wherein said subdividing process comprises multiplication of said noise component by random numbers.

10. The method according to claim 1, wherein said sharpness enhancing process is Gaussian unsharp masking.

11. The method according to claim 1, wherein said smoothing process is Gaussian blurry masking.

12. The method according to claim 1, wherein said noise is graininess in the digital image.

13. The method according to claim 1, wherein said subdividing process is one of subdividing noise mottles.

14. An apparatus for processing digital images to suppress their noise and enhance their sharpness, comprising:

sharpness enhancing means for generating sharpness enhanced image data from original image data;

smoothing means for generating smoothed image data from said original image data;

extracting means for extracting a component containing both edges and noise from said sharpness enhanced image data and the resulting smoothed image data;

weighting data computing means for calculating weighting data for the edge and noise regions of said original image date;

separating means for separating a noise component from said edge/noise containing component;

subdividing means for producing a subdivided noise component from the separated noise component;

means of weighting by the weighting data for said edge region so as to provide an edge enhancing component from said edge/noise containing component; and processed image data computing means for calculating processed image data from said sharpness enhancing image data, said subdivided noise component and said edge enhancing component.

15. The apparatus according to claim 14, wherein said weighting data computing means has edge detecting means for performing direct edge detection from said original image data and calculates the weighting data for said edge and noise regions by an edge component as detected by said edge detecting means.

16. The apparatus according to claim 15, wherein said separating means separates said noise component by performing nonlinear transformation after said edge/noise containing component extracted by said extracting means is weighted by the weighting data for said noise region as calculated by said weighting data computing means.

17. The apparatus according to claim 14, wherein said separating means separates an edge component and said noise component by directly performing nonlinear transformation on said edge/noise containing component as extracted by said extracting means.

18. The apparatus according to claim 17, wherein said weighting data computing means calculates the weighting data for said edge and noise regions from said edge component as separated by said separating means.

* * * * *